United States Patent
Morin

(10) Patent No.: US 11,178,223 B2
(45) Date of Patent: Nov. 16, 2021

(54) SYSTEM AND METHOD FOR NON-NETWORK DEPENDENT CYBERSECURITY

(71) Applicant: Phacil, Inc., McLean, VA (US)

(72) Inventor: Roger Joseph Morin, Stafford, VA (US)

(73) Assignee: PHACIL, LLC, McLean, VA (US)

( * ) Notice: Subject to any disclaimer, the term of this patent is extended or adjusted under 35 U.S.C. 154(b) by 309 days.

(21) Appl. No.: 16/251,369

(22) Filed: Jan. 18, 2019

(65) Prior Publication Data

US 2020/0145381 A1 May 7, 2020

Related U.S. Application Data

(60) Provisional application No. 62/756,736, filed on Nov. 7, 2018.

(51) Int. Cl.
| | |
|---|---|
| *H04L 29/08* | (2006.01) |
| *H04L 12/24* | (2006.01) |
| *G06F 16/901* | (2019.01) |
| *G06N 5/02* | (2006.01) |
| *G06N 5/04* | (2006.01) |
| *H04L 29/06* | (2006.01) |
| *H04L 12/26* | (2006.01) |

(Continued)

(52) U.S. Cl.
CPC ........ *H04L 67/1095* (2013.01); *G06F 16/901* (2019.01); *G06N 5/025* (2013.01); *G06N 5/045* (2013.01); *H04L 41/0213* (2013.01); *H04L 41/0226* (2013.01); *H04L 41/142* (2013.01); *H04L 41/16* (2013.01); *H04L 41/22* (2013.01); *H04L 43/04* (2013.01); *H04L 43/065* (2013.01); *H04L 63/0263* (2013.01); *H04L 63/1425* (2013.01); *H04L 63/1433* (2013.01); *H04L 67/12* (2013.01); *H04L 67/2823* (2013.01); *H04W 12/009* (2019.01); *H04W 56/001* (2013.01); *G06N 20/00* (2019.01); *H04W 84/18* (2013.01)

(58) Field of Classification Search
CPC .............. H04L 67/1095; H05K 7/1498; G05B 23/0221; G06Q 40/02
USPC ......................................................... 726/11
See application file for complete search history.

(56) References Cited

U.S. PATENT DOCUMENTS 5,225,978 A * 7/1993 Petersen ................ G06Q 40/02
 235/379
H1944 H * 2/2001 Cheswick ........................ 726/11

(Continued)

OTHER PUBLICATIONS

Apvrille et al., "DigSig: Run-Time Authentication of Binaries at Kernel Level", 2004 (Year: 2004).*

(Continued)

*Primary Examiner* — Ondrej C Vostal
(74) *Attorney, Agent, or Firm* — Michael T. Abramson; Holland & Knight LLP

(57) ABSTRACT

A method, computer program product, and computer system for applying a firewall security layer to software for hardware interface. Sensor data imported by the hardware interface may be secured using the firewall security layer. The sensor data may be provided to an artificial intelligence (AI) expert system. The sensor data provided to the AI expert system may be analyzed. An indication of an insecure condition may be provided via a user interface based upon, at least in part, analysis of the sensor data.

18 Claims, 15 Drawing Sheets

(51) Int. Cl.
    *H04W 12/00*   (2021.01)
    *H04W 56/00*   (2009.01)
    *G06N 20/00*   (2019.01)
    *H04W 84/18*   (2009.01)

(56) References Cited

U.S. PATENT DOCUMENTS

| | | | | |
|---|---|---|---|---|
| 8,869,268 | B1* | 10/2014 | Barger | G06F 21/552 |
| | | | | 726/22 |
| 9,858,828 | B1* | 1/2018 | Fuka | G09B 7/00 |
| 2004/0045030 | A1* | 3/2004 | Reynolds | H04L 65/604 |
| | | | | 725/110 |
| 2005/0033984 | A1* | 2/2005 | Doherty | G06F 21/554 |
| | | | | 726/4 |
| 2006/0200253 | A1* | 9/2006 | Hoffberg | G05B 15/02 |
| | | | | 700/19 |
| 2011/0030028 | A1* | 2/2011 | Menten | H04L 63/0245 |
| | | | | 726/1 |
| 2014/0047545 | A1* | 2/2014 | Sidagni | G06F 21/577 |
| | | | | 726/25 |
| 2014/0359749 | A1 | 12/2014 | Rieke et al. | |
| 2015/0256355 | A1* | 9/2015 | Pera | H04L 12/2823 |
| | | | | 700/90 |
| 2017/0180395 | A1* | 6/2017 | Stransky-Heilkron | |
| | | | | H04L 63/145 |
| 2017/0353491 | A1 | 12/2017 | Gukal et al. | |
| 2017/0372431 | A1* | 12/2017 | Perl | G07C 5/008 |
| 2018/0054376 | A1* | 2/2018 | Hershey | H04L 12/66 |
| 2018/0123897 | A1 | 5/2018 | Lee et al. | |
| 2018/0213671 | A1* | 7/2018 | Riedel | H05K 7/1498 |
| 2018/0248901 | A1 | 8/2018 | Rieke | |
| 2018/0284735 | A1* | 10/2018 | Celia | G01M 13/045 |
| 2019/0065896 | A1* | 2/2019 | Lee | G06N 3/0454 |
| 2019/0171187 | A1* | 6/2019 | Celia | G05B 23/0221 |
| 2020/0154448 | A1* | 5/2020 | Wilmunder | H04W 72/10 |

OTHER PUBLICATIONS

Cisco, "Chapter 5 Inside the Cisco Centri Firewall", 1997 (Year: 1997).*
Cisco, "What is a Firewall?", 2020 (Year: 2020).*
Cisco, "Cisco Centri Firewall", 1997 (Year: 1997).*
Jiang et al., "KBT: Operating System Kernel Level Binary Translation System", 2013 (Year: 2013).*
Notice of Allowance issued in related Application U.S. Appl. No. 16/251,161 dated Apr. 8, 2020.
Notice of Allowance issued in related Application U.S. Appl. No. 16/251,312 dated Nov. 4, 2020.

* cited by examiner

US 11,178,223 B2

SYSTEM AND METHOD FOR NON-NETWORK DEPENDENT CYBERSECURITY

RELATED CASES

This application claims the benefit of U.S. Provisional Application No. 62/756,736, filed on 7 Nov. 2018, the contents of which are all incorporated by reference.

BACKGROUND

Communication technology currently allows for the free exchange of ideas and information in a manner that was unimaginable only a couple of decades ago. For example, government, corporate entities, as well as individuals, may quickly gather, exchange, and analyze large amounts of information. Unfortunately, use of communication technology, as well as use of most computer technology, may invite ever increasing sophisticated cybersecurity threats, which are not always capable of being identified and thwarted before damage is done. Moreover, when data transfers become too large, it may take more time than is practical to make such transfers over wired or wireless communication.

BRIEF SUMMARY OF DISCLOSURE

In one example implementation, a method, performed by one or more computing devices, may include but is not limited to applying a firewall security layer to software for hardware interface. Sensor data imported by the hardware interface may be secured using the firewall security layer. The sensor data may be provided to an artificial intelligence (AI) expert system. The sensor data provided to the AI expert system may be analyzed. An indication of an insecure condition may be provided via a user interface based upon, at least in part, analysis of the sensor data.

One or more of the following example features may be included. The user interface may include a graphical user interface. The user interface may include one or more indicator diodes. The firewall security layer may be a binary security criteria. The firewall security layer may include a kernel-level binary system integrity validation and restoration. Kernel binary level asset data may be shared with the AI expert system using one of a wired and a wireless interface. The kernel binary level asset data may include at least one of information technology, operational technology, and internet of things asset data.

In another example implementation, a computing system may include one or more processors and one or more memories configured to perform operations that may include but are not limited to applying a firewall security layer to software for hardware interface. Sensor data imported by the hardware interface may be secured using the firewall security layer. The sensor data may be provided to an artificial intelligence (AI) expert system. The sensor data provided to the AI expert system may be analyzed. An indication of an insecure condition may be provided via a user interface based upon, at least in part, analysis of the sensor data.

One or more of the following example features may be included. The user interface may include a graphical user interface. The user interface may include one or more indicator diodes. The firewall security layer may be a binary security criteria. The firewall security layer may include a kernel-level binary system integrity validation and restoration. Kernel binary level asset data may be shared with the AI expert system using one of a wired and a wireless interface. The kernel binary level asset data may include at least one of information technology, operational technology, and internet of things asset data.

In another example implementation, a computer program product may reside on a computer readable storage medium having a plurality of instructions stored thereon which, when executed across one or more processors, may cause at least a portion of the one or more processors to perform operations that may include but are not limited to applying a firewall security layer to software for hardware interface. Sensor data imported by the hardware interface may be secured using the firewall security layer. The sensor data may be provided to an artificial intelligence (AI) expert system. The sensor data provided to the AI expert system may be analyzed. An indication of an insecure condition may be provided via a user interface based upon, at least in part, analysis of the sensor data.

One or more of the following example features may be included. The user interface may include a graphical user interface. The user interface may include one or more indicator diodes. The firewall security layer may be a binary security criteria. The firewall security layer may include a kernel-level binary system integrity validation and restoration. Kernel binary level asset data may be shared with the AI expert system using one of a wired and a wireless interface. The kernel binary level asset data may include at least one of information technology, operational technology, and internet of things asset data.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
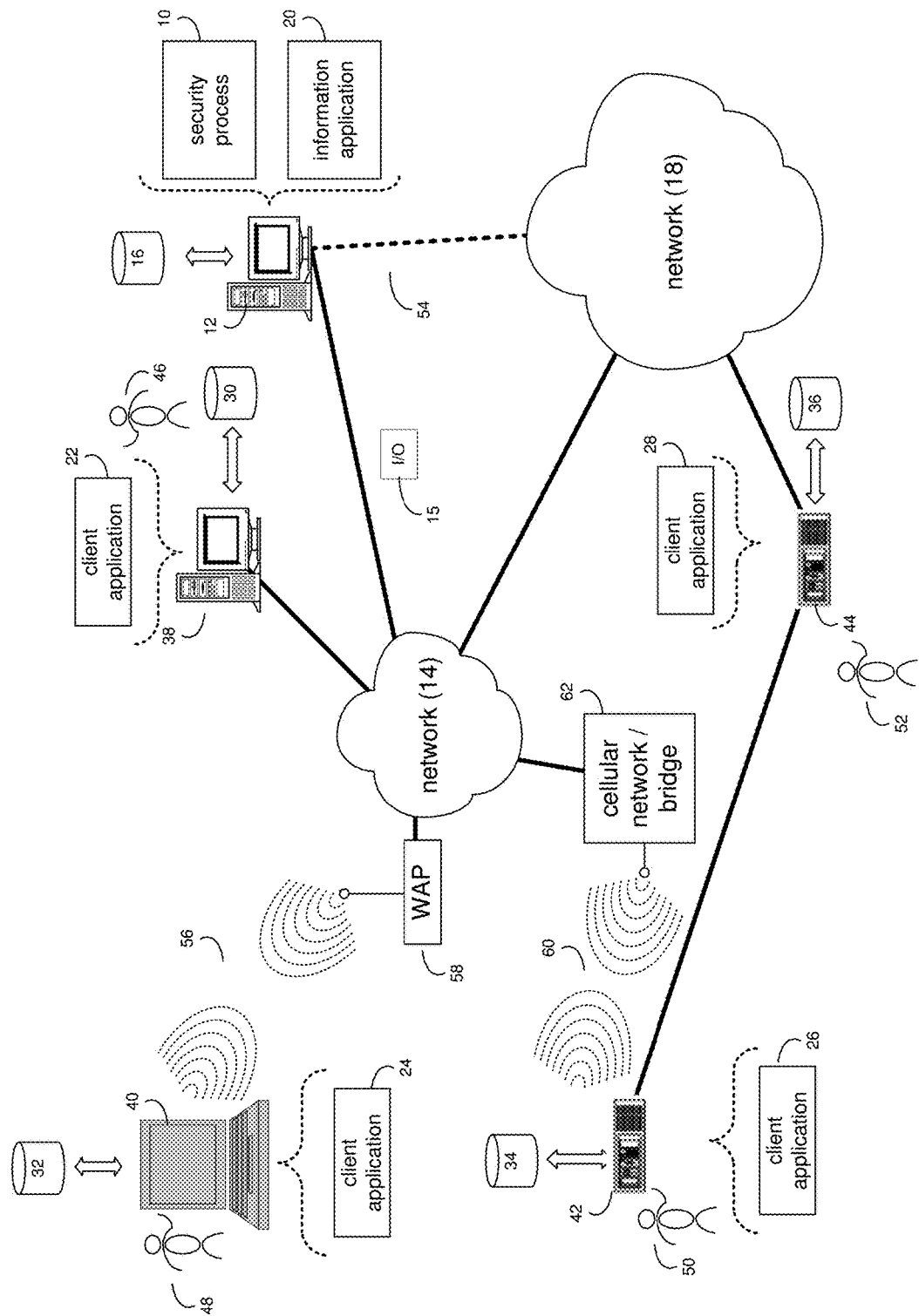
FIG. 1 is an example diagrammatic view of a security process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory.

In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown security process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), a computing cloud(s), or other personalized type of computing device. As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a security process, such as security process 10 of FIG. 1, may coordinate a plurality of node clusters. A mesh topology may be applied across the plurality of node clusters for a plurality of data packets transported through multiple upstream and downstream paths in the plurality of node clusters. Latency may be accounted for in the mesh topology between a first portion of data packets of the plurality of data packets delivered through network independent node clusters of the plurality of node clusters. Latency may be accounted for in the mesh topology between a second portion of data packets of the plurality of data packets delivered through network dependent node clusters of the plurality of node clusters. Data associated with the plurality of data packets may be synchronized by applying the mesh topology across a centralized topology of containers associated with the plurality of node clusters, wherein the mesh topology maintains asymmetric redundancy of the centralized topology of containers.

In some implementations, as will be discussed below in greater detail, a security process, such as security process 10 of FIG. 1, may apply deductive artificial intelligence (AI) attribution and auditability to data inputs, wherein the deductive AI may account for ontologies and competing system information, and wherein the deductive AI attribution and auditability may be applied to the data inputs by vendor workflow. The data inputs applied with the deductive AI attribution and auditability may be processed via a feedback loop to align a sense-understand-decide-act (SUDA) understanding with an inductive AI understanding. The inductive AI may be automated via the feedback loop based upon, at least in part, an AI expert system processing of the data inputs. One or more policy based rules may be developed for user automation authorization based upon, at least in part, the feedback loop.

In some implementations, as will be discussed below in greater detail, a security process, such as security process 10 of FIG. 1, may utilize a first plurality of APIs operating on a first module, wherein the first module may be transportable during operation. A second plurality of APIs operating on a second module may be utilized, wherein the second module may be transportable during operation, wherein the second module may include kernel level binary validation and restoration software, and wherein at least one of the first module and the second module may be interconnected to a mesh topology that maintains asymmetric redundancy. An asset may be interfaced with the second module. It may be determined whether the asset is end-to-end secure based upon, at least in part, the kernel level binary validation and restoration software. An interface may be established between the asset and the first module based upon, at least in part, determining that the asset is secure.

In some implementations, as will be discussed below in greater detail, a security process, such as security process 10 of FIG. 1, may apply a firewall security layer to software for hardware interface. Sensor data imported by the hardware interface may be secured using the firewall security layer. The sensor data may be provided to an artificial intelligence (AI) expert system. The sensor data provided to the AI expert system may be analyzed. An indication of an insecure condition may be provided via a user interface based upon, at least in part, analysis of the sensor data.

In some implementations, as will be discussed below in greater detail, a security process, such as security process 10 of FIG. 1, may apply deductive artificial intelligence (AI) attribution and auditability to data inputs, wherein the deductive AI may account for ontologies and competing system information, and wherein the deductive AI attribution and auditability may be applied to the data inputs by user workflow. The data inputs applied with the deductive AI attribution and auditability may be processed via a feedback loop to align a sense-understand-decide-act (SUDA) understanding with an inductive AI understanding. The inductive AI may be automated via the feedback loop based upon, at least in part, an AI expert system processing of the data inputs. One or more policy based rules may be developed for user automation authorization based upon, at least in part, the feedback loop.

In some implementations, the instruction sets and subroutines of security process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, security process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an information application (e.g., information application 20), examples of which may include, but are not limited to, e.g., an expeditionary Big Data, Operating System, and Application Software Secure Deployment and Information Mobility application, a logistics application, an artificial intelligence (AI) application, a cybersecurity application, a data transfer application, or other application that allows for the gathering, transfer, analysis, and/or protection of data. A non-limiting example of information application 20 may include, but is not limited to, Corbomite™, offered by Phacil, Inc., located in McLean, Va. Generally, Corbomite™ may broadly be described as an integrated system of systems that is network capable but not necessarily network dependent, and may provide information technology (IT), operational technology (OT), and Internet of Things (IoT) end-to-end cybersecurity with much lower size, weight, and power (SWaP) requirements than existing satellite, telecommunication or electromagnetic radiation dependent systems. Corbomite™ may deliver expeditionary artificial intelligence (AI) Sense-Understand-Decide-Act (SUDA) capability to be delivered to forward field operating areas, deploying large data sets, operating system software, and large software applications in less time, with lower cost, greater mobility, and lower physical and cyber threat surface. In some implementations, Corbomite™ may use existing global military and/or commercial logistics and deployment systems from the industrialized rear area to deploy Corbomite™'s integrated hardware/software system of system capabilities to forward field operating areas (e.g., without requiring satellite, telecommunication or electromagnetic radiation content, but capable of being integrated with such transport when desired to provide greater operational flexibility). In some implementations, Corbomite™ may deploy bottom-up cybersecurity using kernel-level binary system integrity validation and restoration software (e.g., which may be carried in a small hardware/software device) that may provide tactical edge users immediate feedback.

In some implementations, Corbomite™ may deploy top-down cybersecurity using Corbomite™ Security Integrate Software Suite (CSISS), which may include, e.g., an agent-less, NIST-aligned, end-to-end cybersecurity occupy, operate, and observe system for IT, OT, IoT assets that may provide a master console for cybersecurity SUDA learning and control (e.g., an AI agile management and learning approach for continuous AI deductive to inductive software application development and integration, which may allow for SUDA expeditionary delivery with auditability), and an AI expert system that may digest, store, and apply external data, ontologies, competing system/threat information, playbooks, and AI attribution/audit information that may replicate and automate cybersecurity by applying its knowledge base and inference engine. In some implementations, by providing continuously attributable and auditable AI, users may be more efficient, effective, held accountable for, given authority to, and delegate responsibilities for SUDA decisions and actions. With automated decisions and actions, Corbomite™ aiSUDA may support the millisecond (or faster) response required to counter malicious cyber actions.

It will be appreciated that while Corbomite™, CorbomiteWARE™ Corbomite™ Agile, Corbomite™ Deployer, and Corbomite™ Security may be used as examples throughout the present disclosure, use of such specific products is not required and is not intended to limit the scope of the present disclosure. That is, any software/hardware that is capable of performing any of the processes of the Corbomite™ software/hardware products may be used without departing from the scope of the present disclosure. As such, the description of Corbomite™ software/hardware products should be taken as example only and not to otherwise limit the scope of the present disclosure.

In some implementations, security process 10 and/or information application 20 may be accessed via one or more of client applications 22, 24, 26, 28. In some implementations, security process 10 may be a standalone application, or may be an applet/application/script/extension that may interact with and/or be executed within information application 20, a component of information application 20, and/or one or more of client applications 22, 24, 26, 28. In some implementations, information application 20 may be a standalone application, or may be an applet/application/script/extension that may interact with and/or be executed within security process 10, a component of security process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of security process 10 and/or information application 20. Examples of client applications 22, 24, 26, 28 may include, but are not limited to, e.g., an expeditionary Big Data, Operating System, and Application Software Secure Deployment and Information Mobility application, a logistics application, an artificial intelligence (AI) application, a cybersecurity application, a data transfer application, or other application that allows for the gathering, transfer, analysis, and/or protection of data, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, a dedicated network device, or other personalized type of computing device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of security process 10 (and vice versa). Accordingly, in some implementations, security process 10 may be a purely server-side application, a purely client-side application, or a hybrid server-side/client-side application that is cooperatively executed by one or more of client applications 22, 24, 26, 28 and/or security process 10.

In some implementations, one or more of client applications 22, 24, 26, 28 may be configured to effectuate some or all of the functionality of information application 20 (and vice versa). Accordingly, in some implementations, information application 20 may be a purely server-side application, a purely client-side application, or a hybrid server-side/client-side application that is cooperatively executed by one or more of client applications 22, 24, 26, 28 and/or information application 20. As one or more of client applications 22, 24, 26, 28, security process 10, and information application 20, taken singly or in any combination, may effectuate some or all of the same functionality, any description of effectuating such functionality via one or more of client applications 22, 24, 26, 28, security process 10, information application 20, or combination thereof, and any described interaction(s) between one or more of client applications 22, 24, 26, 28, security process 10, information application 20, or combination thereof to effectuate such functionality, should be taken as an example only and not to limit the scope of the disclosure.

In some implementations, one or more of users 46, 48, 50, 52 may access computer 12 and security process 10 (e.g., using one or more of client electronic devices 38, 40, 42, 44) directly through network 14 or through secondary network 18. Further, computer 12 may be connected to network 14 through secondary network 18, as illustrated with phantom link line 54. Security process 10 may include one or more user interfaces, such as browsers and textual or graphical user interfaces, through which users 46, 48, 50, 52 may access security process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2A:
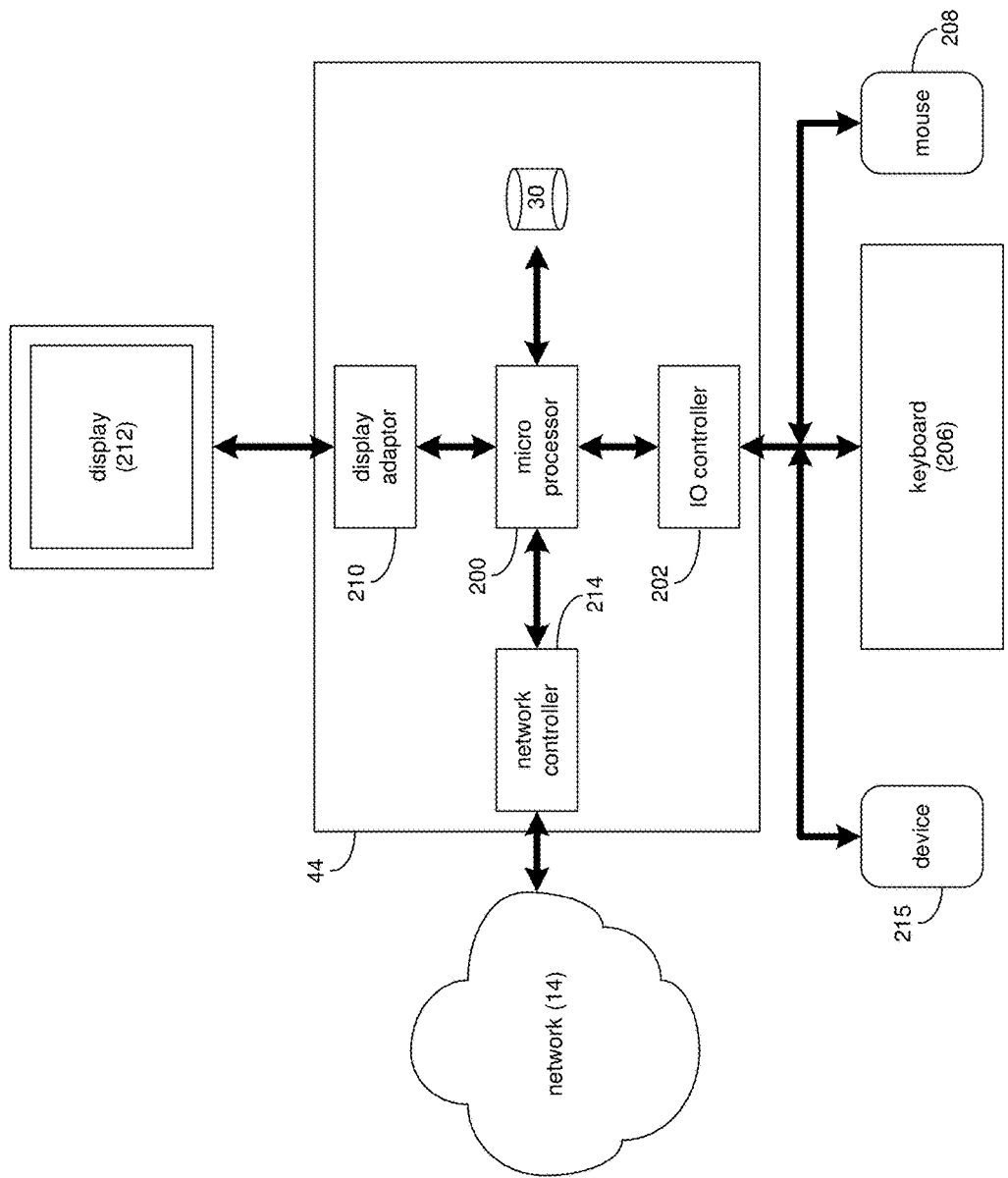
FIG. 2A is an example diagrammatic view of a client electronic device of FIG. 1 according to one or more example implementations of the disclosure.

Referring also to the example implementation of FIG. 2A, there is shown a diagrammatic view of client electronic device 44. While client electronic device 44 is shown in this figure, this is for example purposes only and is not intended to be a limitation of this disclosure, as other configurations are possible. Additionally, any computing device capable of executing, in whole or in part, security process 10 may be substituted for client electronic device 44 (in whole or in part) within FIG. 2A, examples of which may include but are not limited to computer 12 and/or one or more of client electronic devices 38, 40, 42.

In some implementations, client electronic device 44 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., dongle 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 2B:
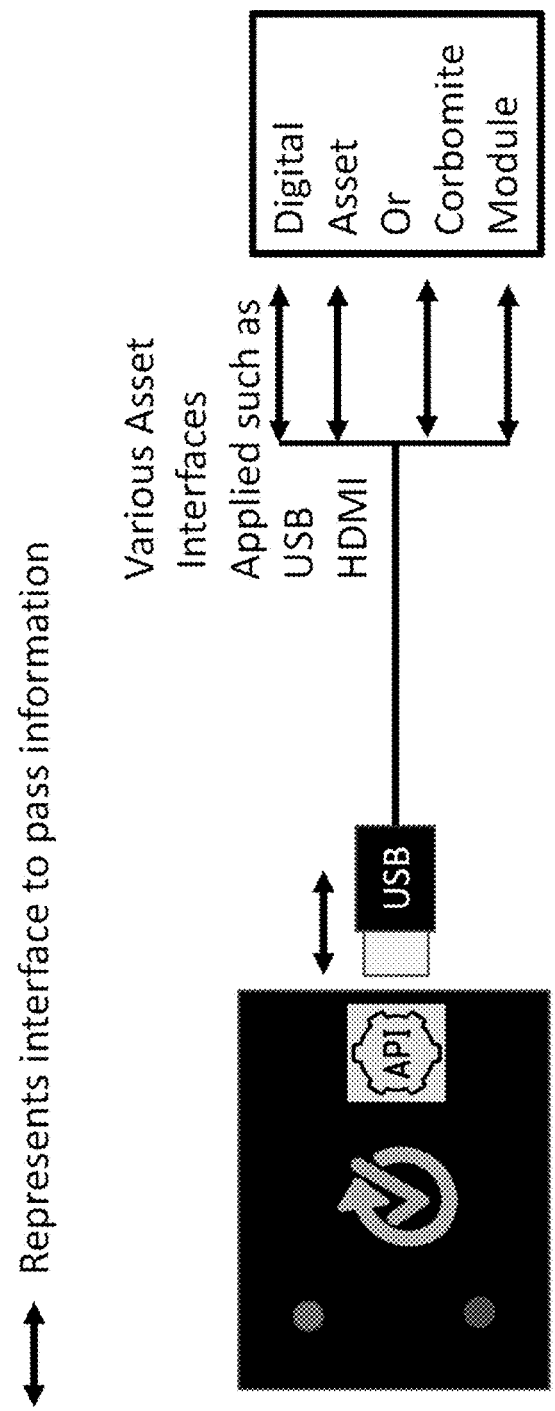
FIG. 2B is an example diagrammatic view of a dongle according to one or more example implementations of the disclosure.
Figure 3:
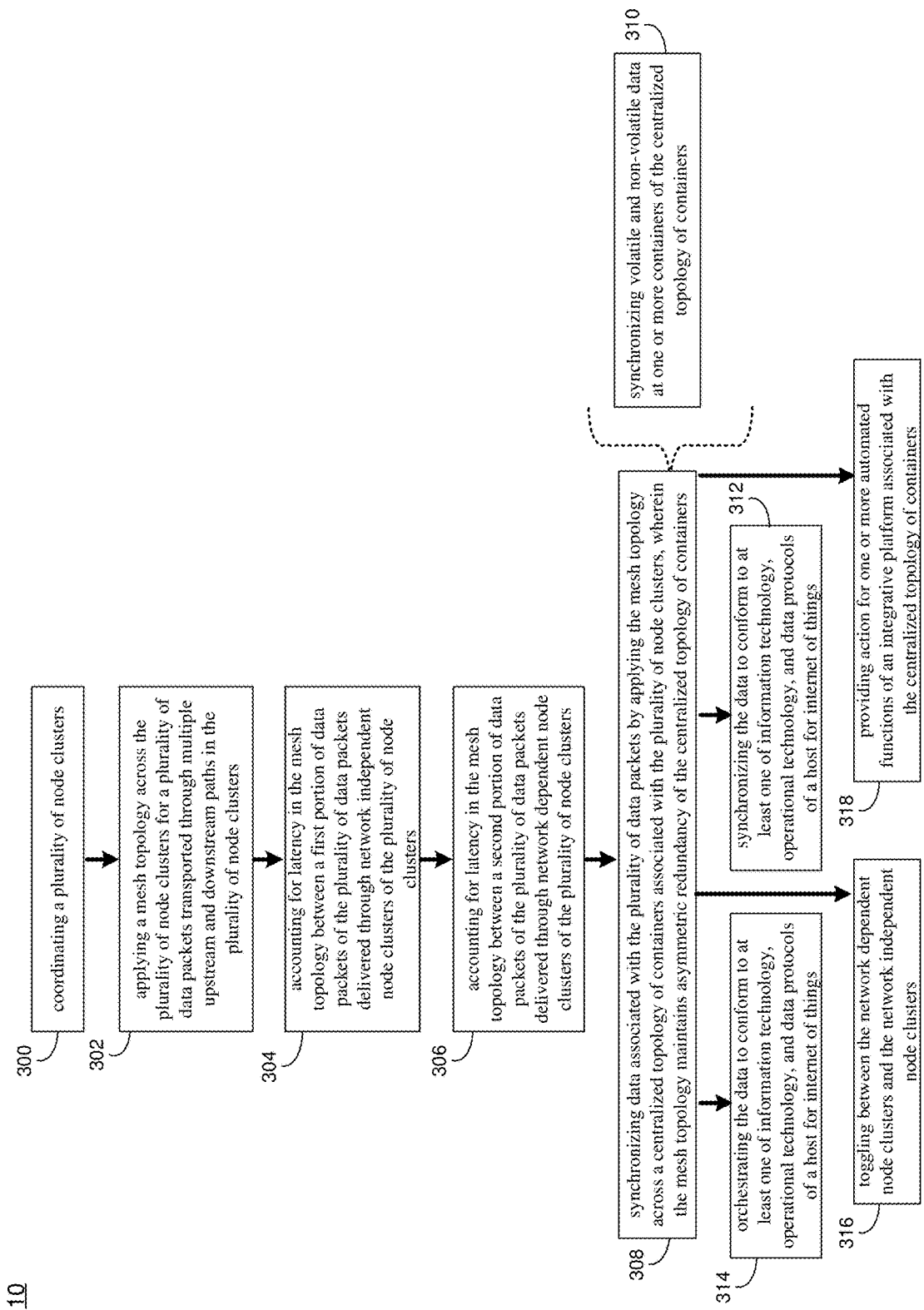
FIG. 3 is an example flowchart of a security process according to one or more example implementations of the disclosure.

In some implementations and referring also to FIG. 2B, dongle 215 (discussed further below) may apply validation and restoration software when interfaced with any digital device. Dongle 215 may observe the binary layer between asset hardware and software as a sensor, validating any binary bit discrepancy. Dongle 215 may signal restoration requirements. No validation discrepancy may signal a green LED light and when it interfaces may send a "green" digital signal. A discrepancy may signal a red LED light and "red" digital signal when interfaced. When interfaced with, e.g., a Corbomite module, it may share information gathered on past interfaces and may accept information back from such a module or other computing device module, applying API software as required.

As will be discussed below, security process 10 may at least help, e.g., improve existing technological processes, necessarily rooted in computer technology in order to overcome an example and non-limiting problem specifically arising in the realm of computer operations associated with, e.g., Big Data, Operating System, and Application Software Secure Deployment and Information Mobility, logistics, artificial intelligence (AI), cybersecurity, and/or data transfer. It will be appreciated that the computer processes described throughout are not considered to be well-understood, routine, and conventional functions.

The Security Process:

As discussed throughout and referring also at least to the example implementations of FIGS. 3-13, security process 10 may coordinate 300 a plurality of node clusters. Security process 10 may apply 302 a mesh topology across the plurality of node clusters for a plurality of data packets transported through multiple upstream and downstream paths in the plurality of node clusters. Security process 10 may account 304 for latency in the mesh topology between a first portion of data packets of the plurality of data packets delivered through network independent node clusters of the plurality of node clusters. Security process 10 may account 306 for latency in the mesh topology between a second portion of data packets of the plurality of data packets delivered through network dependent node clusters of the plurality of node clusters. Security process 10 may synchronize 308 data associated with the plurality of data packets by applying the mesh topology across a centralized topology of containers associated with the plurality of node clusters, wherein the mesh topology maintains asymmetric redundancy of the centralized topology of containers.

In some implementations, security process 10 may coordinate 300 a plurality of node clusters. A node may include, e.g., any IT, OT, IoT asset or user. They may contain operational as well as functional data (e.g., structured or unstructured). When assets, such as Corbomite assets, are disconnected with a network, data may still be collected and stored (e.g., via security process 10) with interfaced IT, OT, and IoT assets. In some implementations, security process 10 may coordinate data when the asset is connected with a network through automatic and/or manual synchronization. This may provide comprehensive visualization, analysis, and mining of all data captured.

In some implementations, security process 10 may apply 302 a mesh topology across the plurality of node clusters for a plurality of data packets transported through multiple upstream and downstream paths in the plurality of node clusters. In some implementations, a mesh topology may generally be described as a decentralized distribution and inter-connection, directly, dynamically and non-hierarchal (as many nodes as possible) of some or all assets. This may enable multipath and multi-master communications. All standard internet protocol(s) data types may be supported (e.g., UDP, TCP, ICMP etc.). Upstream may generally be described as data sent to a node, and downstream may generally be described as data sent from a node. This bi-directional communication may enable the receiving and sharing of information between assets.

In some implementations, security process 10 may account 304 for latency in the mesh topology between a first portion of data packets of the plurality of data packets delivered through network independent node clusters of the plurality of node clusters and in some implementations, security process 10 may account 306 for latency in the mesh topology between a second portion of data packets of the plurality of data packets delivered through network dependent node clusters of the plurality of node clusters. Generally, since some devices may use standard internet protocols (e.g., UDP, TCP, ICMP etc.) accounting for data latency based on network dependency, the focus is attributing information to a location. As all network topologies may introduce a level of data latency, the improved accuracy of calculation of global positioning of a node accounting for the network latency may be beneficial for successful defensive and offensive operations of a node. Other protocols, such as a Named Data Network (NDN) protocol, do not attribute data by location, but instead by data content. However, this method is generally network dependent, as opposed to network independent. A node cluster is multiple nodes with connectivity in between them. A node or a node cluster may collect and process data without network connectivity, and is therefore, not network dependent. If the node requires network connectivity to complete a function, then it is generally considered network dependent. An independent node/cluster may send and receive data to its peer partners. Network dependent node/clusters may generally only send or receive data when connected to the network. Both may be important because, e.g., independent operations allow exchange of data among clustered nodes. Dependent operations allow exchange and real-time synchronization of data between all nodes.

In some implementation, security process 10 may synchronize 308 data associated with the plurality of data packets by applying the mesh topology across a centralized topology of containers associated with the plurality of node clusters, wherein the mesh topology maintains asymmetric redundancy of the centralized topology of containers. Put another way, in some implementation, security process 10 may synchronize 308 data associated with the plurality of data packets by leveraging the mesh network topology among cluster partners as well as cloud backend, wherein the mesh topology maintains asymmetric redundancy (connected or non-connected modes of operations) of the virtualized containers based computer resources. For example, security process 10 may synchronize 308 by applying the above-noted mesh network approach for data packets that get transported through multiple paths, such as the above-noted upstream path (e.g., by tactical or other networks with cloud or on-premise capability) and/or the above-noted downstream path. Security process may apply the mesh topology across the nodal points of a centralized topology using containerization (e.g., Docker containerization) to synch system data and applying updates to data deltas efficiently. In some implementations, synchronizing 308 data may include synchronizing 310 volatile and non-volatile data at one or more containers of the centralized topology of containers. In some implementations, non-volatile memory data may be stored in memory and remains stored within the data capacity of the hardware even if power is lost. Volatile memory data is not generally stored in hardware memory capacity as soon as power is lost. Each node may leverage non-volatile memory to persist data essential to the operation of the node (e.g., configuration and state related information). In addition, as each node may act as a relay point in a mesh networking topology, transient data from adjacent nodes may also be persisted in the non-volatile memory as necessary.

As noted above, the mesh topology maintains asymmetric redundancy of the centralized topology of containers, which departs from the known "hub and spoke" symmetric redundancy. For example, security process 10 may reduce single points of failure by applying redundancies. These redundancies may include the software defined network of containers with mesh networking capability for massing smartly various hardware, such as Corbomite™ hardware. Both clusterable and security hardware are generally provisioned and deployed per customer requirements. Clusterable hardware may deploy the operating system (e.g., CorbomiteWARE operating system) and/or other microservices. Security process 10 may accelerate hardware re-provisioning and redeployment, and may ensure an integrated and clusterable hardware that supplies data storage, computing power, interface ports and cables, wireless interface. All support network capable but not necessarily network dependent integrated, orchestrated, and synchronized interface. Clusterable hardware may be ruggedized to meet customer environmental specifications. Typically, security hardware is no more than 6 ounces with variable dongle interface dependent on customer requirements, but other sizes/weights may be used. Security hardware may interface with clusterable hardware and any digital binary-based asset. This may allow a local network topology where infrastructure nodes may connect directly, dynamically, and non-hierarchically with other network nodes cooperating to efficiently route data from/to clients. This lack of dependency on one node may allow every node to relay information. Generally, current symmetric topology interfaces with a second similar topology in weight, size, power requirement, and capability, distributing key network components evenly around a central transmission, server, switch, or data component and attempting to distribute data evenly in time. This symmetry meets functional and redundancy conditions or priorities regardless of operational conditions or priorities. Information is typically load balanced continuously with consistent throughput rates of data. Symmetrical topology applies omnidirectional tactical communications within the radio frequency spectrum or high-power outer space-based communications, emanating transmission with geographic signature. These symmetric topology conditions, as opposed to asymmetry topology, may improve the chances for competing systems to understand, locate, interrupt, invade, contest, congest, and degrade the symmetric topology. Competing systems may expect, locate, see, interdict, and predict symmetrical topology in time and space and apply contestable conditions, information, or limiting factors/energy degrading the performance of symmetrical topology and its supporting logistics—reducing the operational performance of users. Furthermore, functional topology consistency typically demands consistent operational choices to attain optimal data transmission-based transport mobility. This allows further predictability to competing systems. An example of a symmetrical topology may be shown in the example network 400B in FIG. 4B and in FIG. 8.

Generally, security process 10 may deploy, redeploy, apply, and reapply an asymmetric topology that toggles in and out of interface, without a set pattern, with current symmetric topology, deploying and applying exponentially lower and varying size, weight and power requirements. This may enable security process 10 to allow for application load balancing with inconsistent but larger throughput data rates in time than symmetrical topology. The asymmetric topology may toggle the interface unevenly with both the symmetrical topology and other asymmetric topology clusters per the nature of the constantly varying operational priorities and conditions of users. This unpredictable toggling per operational variance may reduce exponentially the ability of competing systems to locate, interrupt, invade, contest, congest, and degrade. The asymmetrical topology may enable user operational variance to flexibly make choices between clustering topology application, realignment and deployment/redeployment of information capability using varying logistics mobility instead of transmitted data mobility.

In some implementations, security process 10 may synchronize 312 the data to conform to at least one of information technology (IT), operational technology (OT), and data protocols of a host for internet of things (IoT), and in some implementations, security process 10 may orchestrate 314 the data to conform to at least one of IT, OT, and data protocols of a host for IoT. For example, security process 10 may organize IT, OT, and IoT security data (e.g., to include kernel level binary validation and restoration quality information) between the above-noted network dependent and network independent clusters to feed an end-to-end security system. Generally, IT data may be binary bits of information that are transmitted through or stored in any information technology hardware, firmware or software to support logical algorithmic processing or to be organized and reorganized by the processing to support human-to-computer or information client interaction. Generally, OT data may be binary bits of information dedicated to detecting or causing changes in physical processes by organizing into bits of feedback that directly monitors and/or controls physical devices. Generally, IoT data may be binary bits of information that transfers over a network without requiring human-to-human or human-to-computer interaction supporting a system of interrelated computing devices, mechanical and digital machines, objects, animals or people that are provided with unique identifiers (UIDs) that may be attributed to this data.

In some implementations, the kernel level binary information may form the foundational binary communication between hardware and software nodes or is the core of an IT, OT, or IOT operating system. In the former, it may provide the first level of abstraction for binary discourse within hardware, firmware, or software defined nodes. In the latter, it may provide the core logic that bridges applications nodes with data processing nodes. Validation may generally be described as the logic that acknowledges that not one kernel level binary bit is out of its provisioned and deployed logical sequence per node. If one bit is out of place or absent it is not generally secure. Restoration may generally be described as the logic applied to arrange these bits in an authorized prescribed sequence per node signaling a node is secure. Data signals showing validation or lack of validation and/or restoration per node may be further shared by LED signals on interfaced hardware (e.g., dongle 215) or by security software through network or clusterable module interface. The former affords users immediate signals (e.g., green LED meaning secure, red LED meaning not-secure). The latter signals the same, may be displayed by graphical interface, and may be logged, collected, and analyzed for security sensing, understanding, decision, and action through security process 10. Security process 10 may apply a runtime management tool for containers (e.g., Docker containers) that may efficiently coordinate the node clusters at scale. This enables security process 10 to handle the scheduling, launching, and management of the containers. Generally, this may include the ability to scale the number of containers up or down on demand, load conditions, and availability. This may be referred to self-healing and self-adjusting container management.

In some implementations, security process 10 may toggle 316 between the network dependent node clusters and the network independent node clusters, and in some implementations, security process 10 may provide 318 action for one or more automated functions of an integrative platform associated with the centralized topology of containers. For example, security process 10 may include an AI expert system applied to assist AI vendors to attribute automated decision and action from machine learning data that bifurcates between network dependent and network independent data by, e.g., supporting the application of AI Agile workflows (that may themselves be unique). The massing of one or more capabilities, such as those provided by Corbomite™ Deployer, into cluster-able nodes that toggle 316 between network capability and non-network dependency may be managed by the above-noted orchestration 314, which may assist with the up and down scale, mapping network dynamics in real-time.

In some implementations, security process 10 may couple the above-note configuration management tool (which may be at least a portion of security process 10) with the above-noted Docker container management tool (which may be at least a portion of security process 10). Security process 10 may push changes out to host computing devices, making them configuration driven, while keeping the Docker containers up and running. In some implementations, the changes affecting any networked device configuration across the following layers may be applied for offensive or defensive security or other microservice mission purposes: e.g., geographic, physical, logical (communication ports and protocols), machine language, operating system, software application, or personal. For instance, the geographic layer is also noted as "cyber-terrain." This layer may address the path of data in and out of any symmetric or asymmetric network. The symmetric network path being redundant telecommunications, satellite or radio frequency supported networking (Open Systems Interconnection (OSI) layers 2, 3, & 4, which are all data link, network, and transport layers) delivering microservices through cloud or on-premise deployment and sharing information between them. The asymmetric path may toggle between this symmetric network, as defined by the user, and security process 10 capable clusterable modules at times using various logistic physical network mobility at the user site or in transit to the user. In the defense or offense, security process 10 may occupy, operate and observe the various layers of each networked asset directed by the AI system to sense, understand, decide and act per user guidance. This may allow security process 10 to manage and optimize operational platforms that it may provide. For instance, this may enable security process 10 to make consistent the dynamic massing of one or more capabilities (e.g., administration, intelligence, command and control, and logistics etc.), such as those provided by Corbomite™ Deployer, with disparate hybrid network and platform interaction plug and play. For example, the plug and play aspect may facilitate the discovery of a hardware component in any system without the need for physical device configuration or user intervention in resolving resource conflicts. The hardware being plugged into are assets that exist within any of the following example and non-limiting Open Systems Interconnection model abstraction layers, e.g., Physical, Data link, Network, Transport, Session, Presentation, and Application. Security process 10 may push the above-noted example changes that may be reconciled dynamically, along with organizing network "pipes," load balancing, and conducting firewall maintenance and intrusion detection.

In some implementations, the mesh topology may self-organize and self-configure. Our Mesh network self-organizes and self-configures enabling dynamic workload distribution, even as nodes fail, which is the contestable nature of expeditionary networks. Nodes connected in a mesh topology are generally capable of discovering a path to their final destination dynamically and automatically. This allows them to self-organize within the network. When connected, a node may refresh or acquire its configuration dynamically from a trusted source, which is self-configuration. This is accomplished typically by leveraging multipath and multi-master capabilities of the mesh network. This fault-tolerance reduces overhead resources and costs.

Figure 4A:
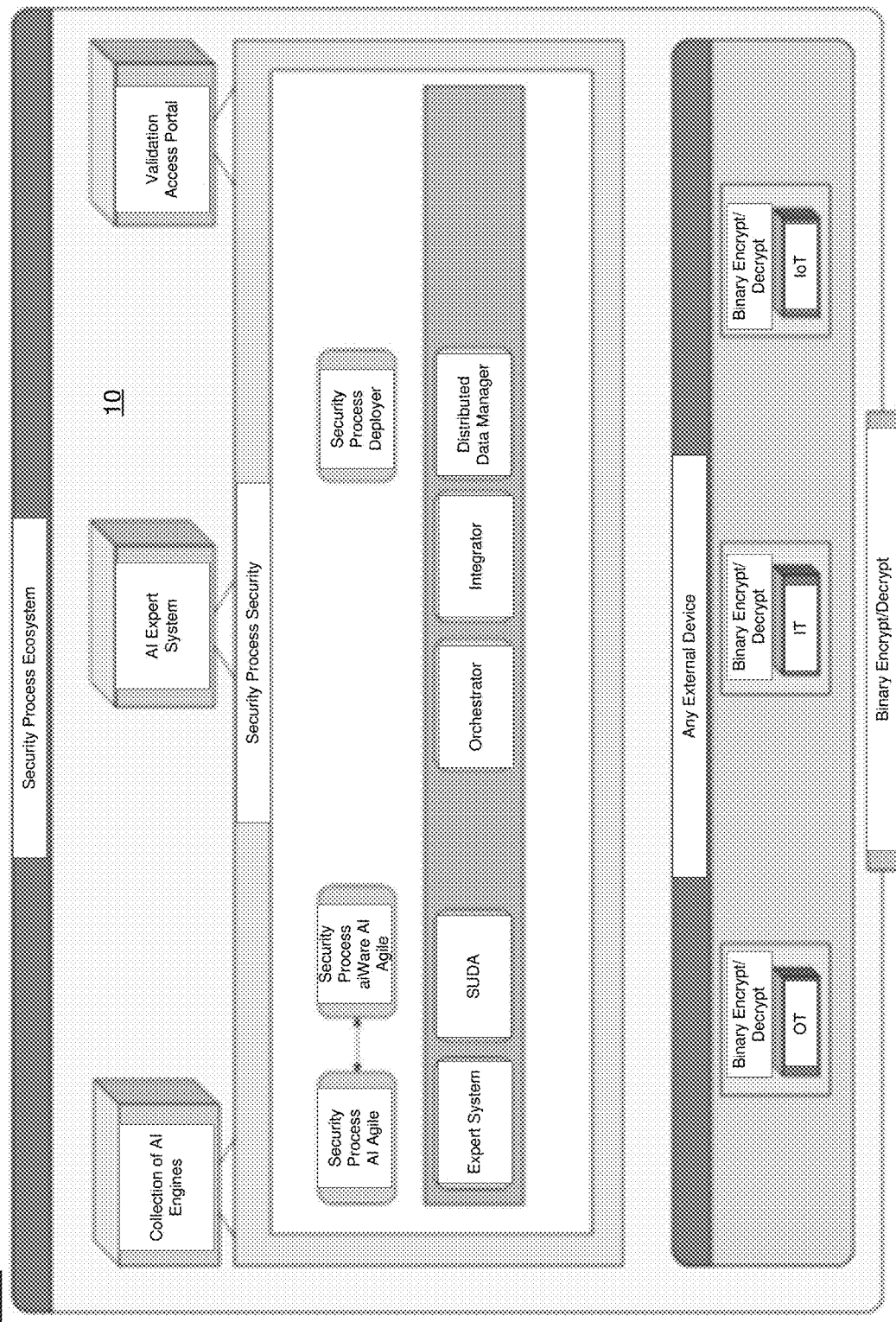
FIG. 4A is an example diagrammatic view of one or more components of a security process according to one or more example implementations of the disclosure.
Figure 4B:
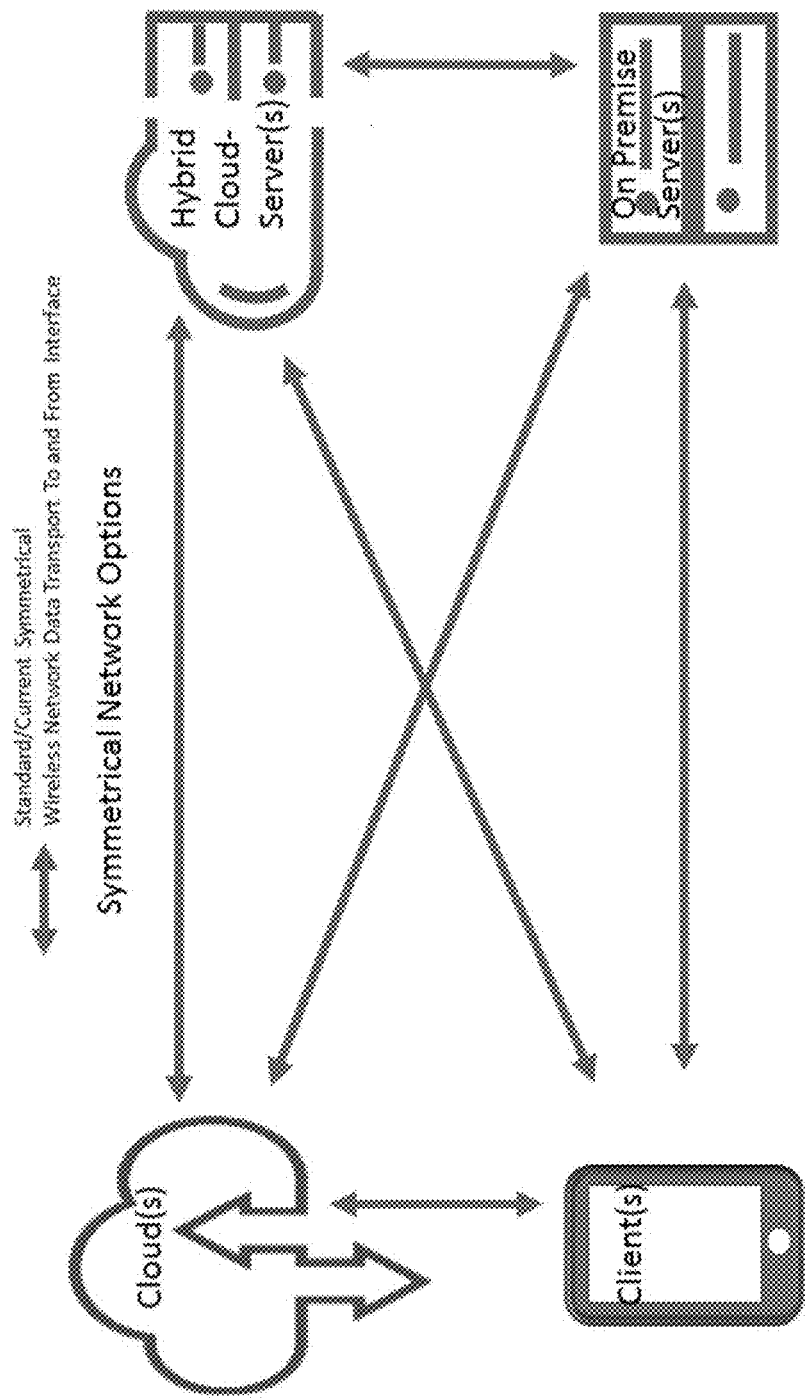
FIG. 4B is an example diagrammatic view of an example symmetrical network topology according to one or more example implementations of the disclosure.
Figure 5:
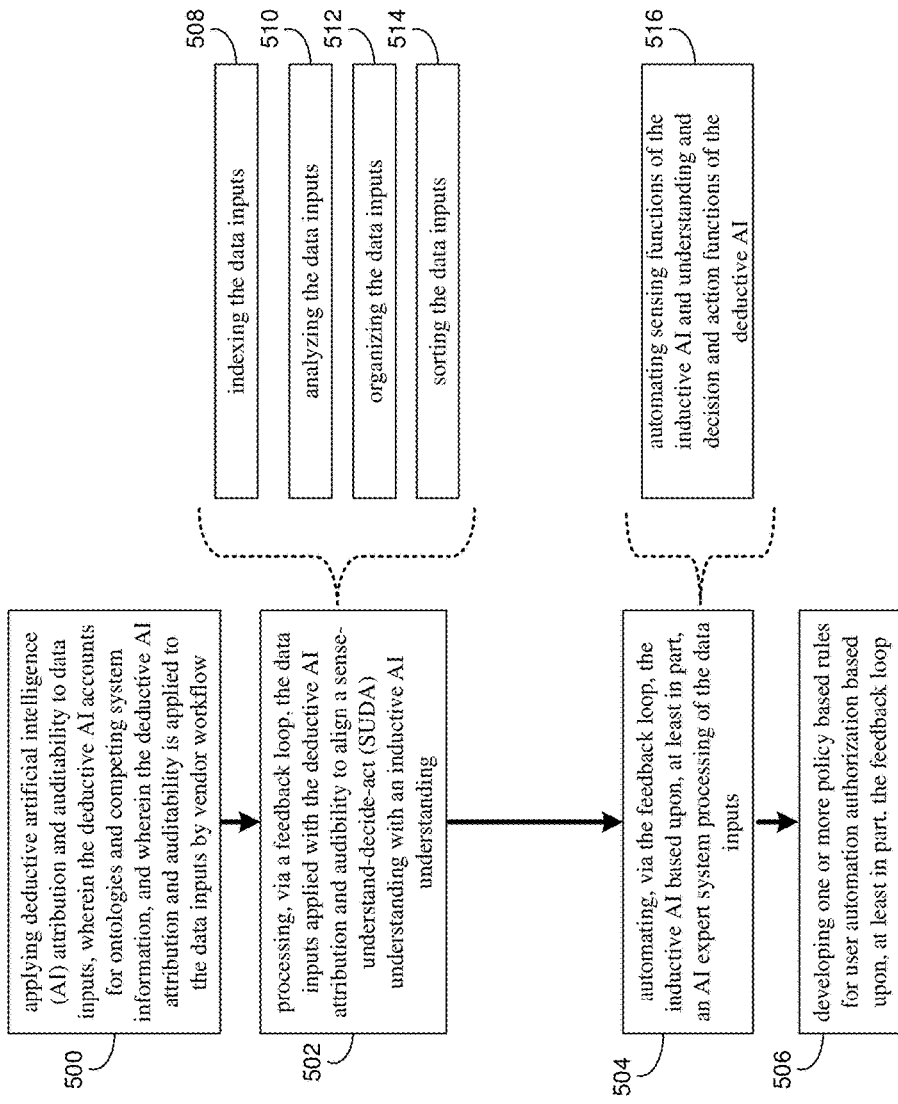
FIG. 5 is an example flowchart of a security process according to one or more example implementations of the disclosure.

Referring at least to the example implementation of FIG. 4A, an example schematic block diagram 400A of one or more components of security process 10 is shown. Each of these components and their various interactions with each other and/or external entities are described throughout the present disclosure. It will be appreciated that while a specific schematic block diagram of one or more components of security process 10 is shown in FIG. 4A, more or less components may be used without departing from the scope of the present disclosure. As such, the specific components of security process 10 shown, as well as the specific layout of these components, should be taken as example only and not to otherwise limit the scope of the present disclosure.

As discussed throughout and referring also at least to the example implementations of FIGS. 3-13, security process 10 may apply 500 deductive artificial intelligence (AI) attribution and auditability to data inputs, wherein the deductive AI may account for ontologies and competing system information, and wherein the deductive AI attribution and auditability may be applied to the data inputs by vendor workflow. Security process 10 may process 502, via a feedback loop, the data inputs applied with the deductive AI attribution and auditability to align a sense-understand-decide-act (SUDA) understanding with an inductive AI understanding. Security process 10 may automate 504, via the feedback loop, the inductive AI based upon, at least in part, an AI expert system processing of the data inputs. Security process 10 may develop 506 one or more policy based rules for user automation authorization based upon, at least in part, the feedback loop.

In some implementations, security process 10 may apply 500 deductive artificial intelligence (AI) attribution and auditability to data inputs. For example, security process 10 may continuously develop and execute one or more AI applications, such as the Corbomite™ AI application, with attribution and auditability. Deductive or Symbolic AI is generally human-readable representations of problems, logic and search. The most successful form of symbolic AI is typically expert systems. Inductive AI or Non-symbolic AI submits that human-based information formats are not always the best fit for AI, and encourages feeding raw information into the AI that it can analyze and construct its own implicit knowledge to solve a problem. Non-symbolic AI is inductive logic and may include machine learning and deep learning. Security process 10 may orchestrate, integrate, and synchronize data and information inputs and outputs between systems and an AI expert system to accomplish sensing, understanding, decision, and action that is human attributable and human auditable. It is human attributable because humans can observe and understand information logs that show alignment between human process problem solving, logic and search with if-and-then algorithm representations. It aligns this with the humans' authorities, responsibilities, and accountabilities. All this is auditable because security process 10 ensures the logs can be made available to show the exact time or each attribution occurrence. Attribution may be generally described as, e.g., data or other informational input (e.g., cyber threat data) and playbook logic that may be applied, at least in part, to a deductive AI portion of security process 10 to produce a sense-understand-decide-act (SUDA) output, described further below. In some implementations, security process 10 may transport, orchestrate the aggregation of data, and then integrate and synchronize between AI systems or other systems to ingest this data, perform either symbolic or non-symbolic AI computations and then deliver feedback data. Security process 10 may do this for binary data that is either structured or unstructured. Structured data is generally data organized into a pre-defined formatted repository, typically a database, so that its elements can be made addressable for more effective processing and analysis. Unstructured data generally either does not have a pre-defined data format or is not organized in a pre-defined manner. Security process 10 may apply an AI expert system that uses ontology data, or ontologies, to relate other structured data to various domains, such as cybersecurity, command and control, logistics, administration, information operations and intelligence. These ontologies are typically structured data that encompass a representation, formal naming, and definition of the categories, properties, and relations between the concepts, data, and entities that substantiate one, many, or all domains. The expert system computer code of security process 10 may be continuously designed to implement strategies from the best human experts, per each domain, in the form of playbooks. Ontologies may allow the expert system to understand the meaning of the data it is observing and AI-driven playbooks encode the tradecraft knowledge and experience of human experts. Security process 10 may effectively observe other systems' data against these playbooks that sense, understand, decide and act (SUDA) per the collective knowledge and experience of human experts who have encoded their tradecraft knowledge and experience in the AI-driven playbooks. These playbooks emulate the sense-making, understanding, decision-making, and action abilities of human experts per their authority, responsibility, and accountability granted by user command and control parameters. These playbooks may be shareable, fully attributable, and used to train and educate users of security process 10.

For data that is unstructured, security process 10 may provision, deploy, and apply non-symbolic AI systems software microservices or other software microservices to generate structured information that feeds the AI expert system driven SUDA. Attribution may generally be described as, e.g., the interface to contextually and graphically show (e.g., via security process 10) efficiently and effectively all logic behind inputs per aiSUDA outputs. The interface (e.g., via security process 10) may demonstrate the code that the vendor wrote or user applied per moment in time. It does this in a user-friendly method by displaying contextually a matrix that links user SUDA directed input with SUDA output. And, it may convert this matrix to graphically display and graphically allow interface to drill down on the information. Users may use security process 10 to toggle between this user-friendly display organized per domain down through the step by step application of code with input and outputs across playbook logic used, ontological basis aligned, or data processed. Thus, in some implementations, security process 10 may include an AI expert system, which may apply 500 the AI expert system's (deductive AI) playbook attribution and auditability to ensure some or all development, particularly automated AI, remains customer accountable (e.g., the customer may at any time audit the vendor AI Agile DEVOPS Steps and ensure they meet their decision criteria, performed between Steps D and E and Steps D and A below. They may observe data logs on all entries to the process noted by date and time). Besides the customer being able to attribute their decisions to automate AI sensing, decision and action, security process 10 may also attribute, using the same capability. Security process 10's continuous AI Agile DEVOPS AI software coding modifications and the logic behind these modifications may be logged by step (e.g., A. SUDA Contracted Technical Requirement Rationalization and Interpretation; B. AI Content and Applications Rationalization and Interpretation; C Steps: C.1 Collect, Clean, and Consolidate Data; C.2 Attribution Model design per AICA, C.3 Develop, integrate with, or improve Expert System Playbook(s); C.4 Develop SUDA Automation; D. Evaluate to align SUDA attribution and provide auditable vendor delivery aligned with contracting authority, responsibility and accountability requirements; between steps D and E, user authority may decide whether or not to take Step E, which allows security process 10 to AI Provision and Improve then AI Deploy and Upgrade. Also, before taking Step D back to A, user authority may decide whether to or not to inform Step A with Step B through E information.

In some implementations, the deductive AI attribution and auditability may be applied 500 to the data inputs by vendor workflow. For example, the above-noted steps may include providing information to support user training and education. User responsibility and accountability decision takes place between steps D and user authority decides whether or not to take Step E, which allows security process 10 to AI Provision and Improve then AI Deploy and Upgrade. This may also include whether to develop user training and education curriculum, manuals, and materials. The process by step may be logged in date and time and forms an auditable trail of attribution between use decisions and vendor support to these decisions. This is unique and important because it allows for users per authority, responsibility, and accountability granted by the user leadership hierarchy to automate AI supported sensing, understanding, decision and action feedback for an IT, OT, or IoT assets to respond virtually or physically without a HITL condition being involved. This allows for a HITL split second rapid reactive virtual or physical response to either defend or offend a competing system but attribute the user legal authority, responsibility, and accountability per each action in order to support follow-on moral and ethical inquiry.

In some implementations, the deductive AI portion of security process 10 may account for ontologies and competing system information, where the competing system information may include, e.g., one of cybersecurity threat information and the one or more policy based rules (e.g., playbooks) for user automation authorization. For example, security process 10 may apply an ontology baseline that is already configured for cybersecurity. This baseline is for showing cybersecurity data (e.g., events, incidents/cases, STIX, correlations, etc.) into the representation of entities (e.g., IP, user, removable device, etc.) and their relationships (e.g., event names, properties of event, internal relations, etc.). This baseline may be used for the future design and development of follow-on domain ontologies. Security process 110 may apply competing system information that is supplied by, e.g., the US government or any industry actor certified by the US government to produce and distribute competing system information (e.g., cybersecurity threat information).

In some implementations, security process 10 may process 502, via a feedback loop, the data inputs applied with the deductive AI attribution and auditability to align a SUDA understanding with an inductive AI understanding. For example, in some implementations, processing 502 the data inputs may include indexing 508 the data inputs. For example, security process 10 may apply a data structure technique, indexing, to efficiently retrieve records from the AI data based on defensive and offensive attributes. These may include, e.g., geographic, physical, logical (e.g., communication ports and protocols), machine language, operating system, software application, or persona attributes.

In some implementations, processing 502 the data inputs may include analyzing 510 the data inputs, organizing 512 the data inputs, and/or sorting 514 the data inputs. For example, the data may be analyzed applying abstractions within data attributes. These abstractions may apply playbooks with code that mimics human expert deduction and accounts for competing system deduction, applying also facts, rules, definitions or properties. The playbooks are typically "if-and-then" coded. The attributes organize data inputs and outputs by, e.g., geographic, physical, logical (e.g., communication ports and protocols), machine language, operating system, software application, or personal indexing. This may be conducted within the workflows explained above.

In some implementations, an AI machine learning (inductive AI) portion of security process 10 may deliver algorithms, AI training information, and/or models combining both, and may then supply information as hypotheses. These outputs alone are generally insufficient for an AI unified view and measurable aiSUDA attribution and auditability to any user. Inductive AI typically focuses on an estimation, based on known properties learned from training data. Inductive AI typically applies patterns to arrive at a conclusion that is speculative. This is called a hypothesis, which is always less certain than the evidence. In other words, the conclusion is only probable. This probability does not lend to the level of legal (forensic) certainty demanded by the basic standards of user authority, responsibility, and accountability for sensing, understanding, decision and action outputs. Moreover, a human generally cannot make consistent sense out of the algorithmic path nor in the training model data, which also varies, to attribute any inductive AI automated sensing, understanding, decision and action feedback. Conversely, security process 10's deductive AI may emulate the sense-making and decision making of a human expert, applying human-based ontological reference with human-based playbook logic to reason with knowledge and solve complex problems like the human expert but timelier than the human expert. A human can make sense of the trail of coding behind any output; therefore, each and every conclusion is certain—attributable. An AI expert system may do this too. Because it emulates the human expert—one with authority, responsibility, and accountability. Because user authority, responsibility and accountability behind sensing, understanding, decision and action must be legally certain, and are desired to be ethically and morally certain by qualifiedly degree, with attribution, induction is unsuitable and insufficient for SUDA. To gain SUDA that is attributable and auditable, security process 10 may apply its Agile AI continuous development methodology with its AI expert system that may encode, store, and organize knowledge/data inputs to align SUDA mission understanding with AI Content/Application understanding iteratively to provision/improve, deploy and/or upgrade the capability of security process 10. Put another way, by using a feedback loop to process 502 the data inputs applied with the deductive AI attribution and auditability to align a SUDA understanding with an inductive AI understanding, as well as automating 504, via the feedback loop, the inductive AI based upon, at least in part, an AI expert system processing of the data inputs, the resulting outputs would generally be sufficient for an AI unified view and measurable aiSUDA attribution and auditability, where security process 10 may then be able to develop 506 one or more policy based rules for user automation authorization based upon, at least in part, the feedback loop. Security process 10's deductive AI may ingest structured data to accomplish attributable sense-making, understanding, decision-making, and action. This may be a circular continuous process of first sensing data, then becoming knowledge or understanding, then making a decision with this understanding to possibly take or not take an action. This final step provides feedback to further align or realign this process. Much data is unstructured. Unstructured data is varying forms of information that do not align with a pre-defined data model. Structured data is the opposite. Structured data is formatted. So, structured data elements are more addressable for effective processing and analysis. Any data becomes knowledge when data is put into context through processing and analysis. Inductive AI, through processing and analysis, may ingest unstructured data and provide structured data sense-making knowledge outputs, called tentative hypotheses, to feed the first part of the circular and continuous deductive AI process. These structured data/information feeds are in addition to structured information that is ingested from analytical or scoring engines. Security process 10 microservices an integrated delivery between inductive AI with core deductive AI, with all other cores of security process 10. This is a unique efficient and effective means where both inductive and deductive complement each other and may provide big data SUDA at the expeditionary edge. When applied with both vendor and user, security process 10's AI Agile attribution, this complementary microservice integration may be automated with authority, responsibility, and accountability to perform forensically defined SUDA that supports operational requirements.

Generally, there may be one or more levels of security process 10 playbooks. For example, level 1 may be the sense-making or understanding level—user aligned cognitive playbooks. Level 2 may be the decision level—authoritative playbooks, and level 3 may be the action level—mechanistic response playbooks. All levels interrelate through security process 10's AI Agile. The tentative sense-making hypothesis from inductive AI provides information to security process 10's AI Agile process that may assist level 1 cognitive playbook development. Human expert or expert system logic applies knowledge representation and reasoning to validate the inductive AI tentative hypothesis. This validation of hypothesis and explanation of activity using domain knowledge and human experience is captured in coding. This coding becomes a set of level 1 playbooks or cognitive playbooks.

In some implementations, automating 504 the inductive AI may include automating 516 sensing functions of the inductive AI and understanding and decision and action functions of the deductive AI. For example, automated inductive AI may occur when security process 10's AI Agile applies user preferences to automate sensing to first level of understanding through coded permissions inputs to the non-symbolic (inductive) microserviced application. The same approach may allow for the automating of full understanding, decision and action to the symbolic (deductive) expert system. SUDA examples may include, e.g., inputting unstructured video information into a non-symbolic microserviced application, which may also input the video with aligning temporal and spatial information. The non-symbolic AI outputs faces (sensing to first-level understanding) that are recognized as potentially aligning with system users during a specific time and location—a set of tentative hypotheses. It supplies these alignments with statistical match probability and supply a tentative name to each face. These face names by time and space and statistical match (structured information) are then inputted into the expert system of security process 10. These expert system's playbooks executing per a cybersecurity domain then apply an inference engine with playbooks that associate IT, OT, and IoT persona behavior (knowledge—facts) with other cybersecurity layers of behavior in time and space. The playbooks apply human expert emulation at recognizing malicious behavior (understanding) to supply further alignments of names, times, and places associated with these behaviors. This is a validation of hypothesis with an explanation of activity. Applying domain knowledge with human experience captured in cognitive playbooks. These alignments are sent automatically, due to user preference and AI Agile development, to a systems administrator who provides this information with attribution for authorities to decide to stop any user access whose names align with the names of questionable behavior. The user's authority audits the full attribution and directs playbook development to automate tentative loss of access (action) for any user exhibiting the attributed behavior in the future.

Figure 6:
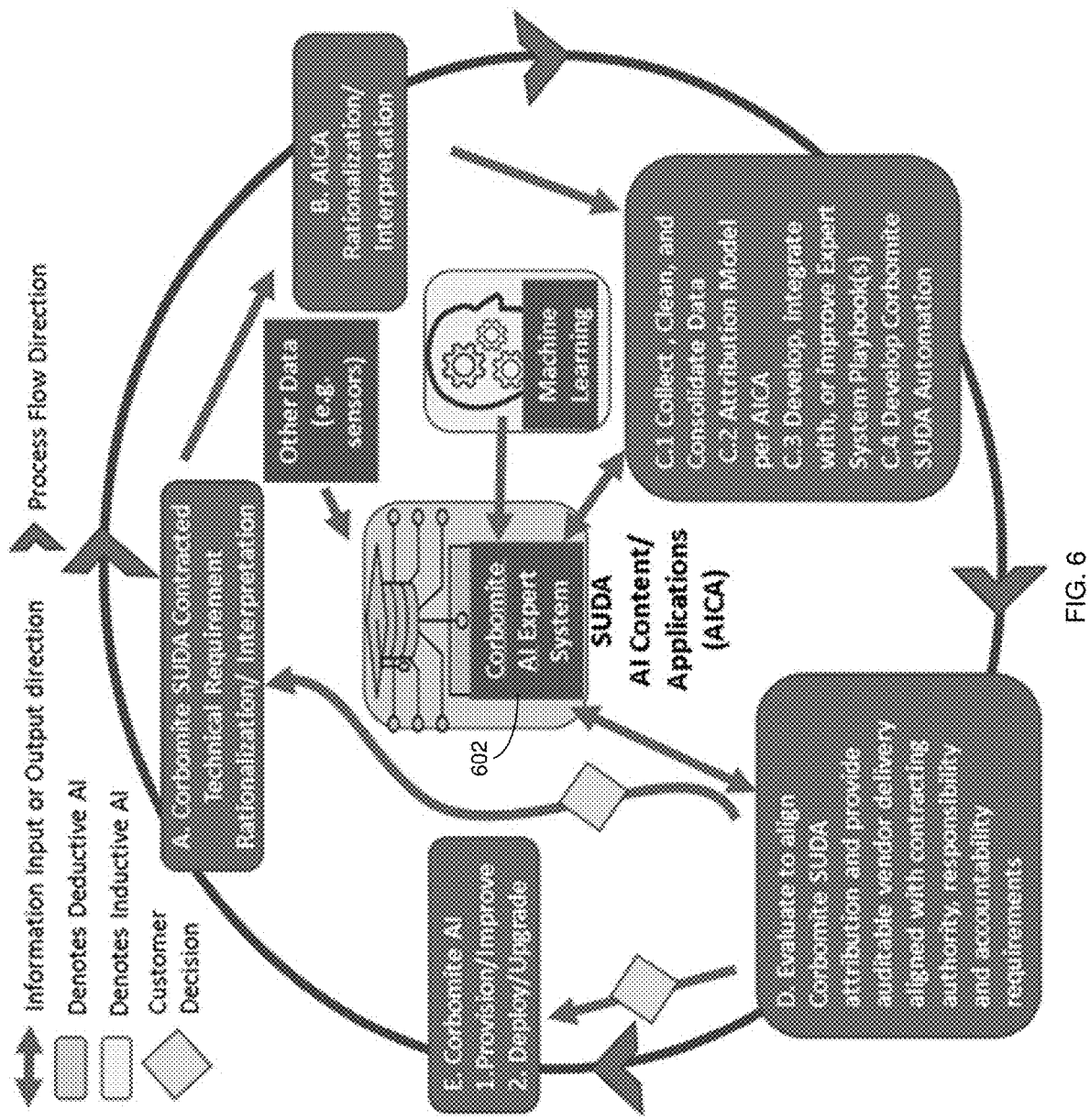
FIG. 6 is an example diagrammatic view/flowchart of a security process according to one or more example implementations of the disclosure.
Figure 7:
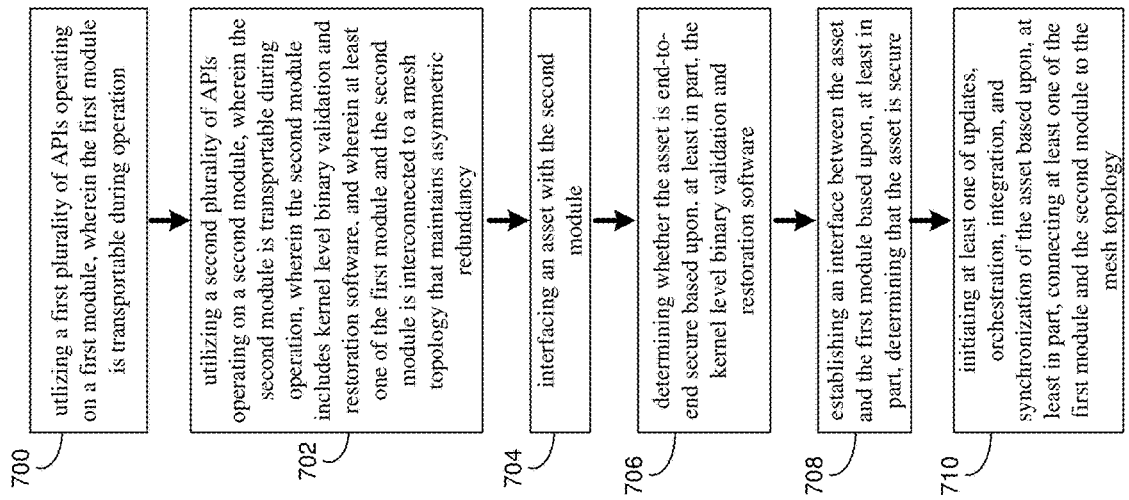
FIG. 7 is an example flowchart of a security process according to one or more example implementations of the disclosure.

Thus, in some implementations, and referring at least to the example implementation of FIG. 6, security process 10 may enable each step A-E of an example process to be continuously managed (e.g., quality assured, risk mitigated, etc.) per customer (e.g., vendor, user, etc.) requirements. Unlike a standard Agile DEVOPS mode that merely supports application development, security process 10 may be integrated into the standard Agile DEVOPS application (and/or may include its own similar standard Agile DEVOPS application) to conduct the development of any software, e.g., when there may be a requirement to ensure the development of SUDA attribution and auditability. The AI expert system portion of security process 10 (e.g., AI expert system 602) may store, process, and graphically display past and present Agile information associated with security process 10.

Accordingly, in some implementations, security process 10 may use AI Agile management and learning methodologies that provide continuous AI deductive to inductive software application integration development with attribution and auditability. Users may be more efficient and effective at, held accountable for, given authority to, and delegate responsibilities for both aiSUDA products, decisions, and actions to include automating AI decisions and actions due, at least in part, to this process delivery. Generally, without automated decisions and actions of security process 10, AI cannot support the millisecond speed required to counter malicious cyber actions (e.g., cybersecurity). As noted above, security process 10 may process the relevant information, which may be stored and accessed in an AI expert system, and may provide the critical information and knowledge base to efficiently and effectively provide continuous education and training of AI knowledge to technical support staff, decision makers, their staffs, and subordinate users.

It will be appreciated that while a specific schematic block diagram and flowchart is shown in FIG. 6, more or less components and/or alternative steps and order of steps may be used without departing from the scope of the present disclosure. As such, the specifics shown in FIG. 6 should be taken as example only and not to otherwise limit the scope of the present disclosure.

In some implementations, security process 10 (e.g., which may include other microservices) may enable one or more users (e.g. management teams) to use development operations (DEVOPS) with artificial intelligence (AI) Agile to continuously develop and attribute automated sensing, understanding, decision, and action. For instance, DEVOPS and AI Agile may (e.g., via security process 10) continuously apply human-in-the-loop (HITL) or human-on-the-loop (HOTL) Agile management methods to answer software problems. HITL is AI that requires human interaction throughout SUDA. HOTL is AI that requires human decision to automate SUDA. DEVOPS does not generally attribute automated operational sensing, understanding, decision, and action. This may be accomplished by security process 10 applying an attributable AI system (e.g., symbolic AI known as an expert system) with AI Agile per FIGS. 6 and 13. Symbolic AI is human-readable representations of problems, logic and search. The most successful form of symbolic AI is expert systems. This is also known as deductive AI. Non-symbolic AI generally submits that human-based information formats are not always the best fit for AI and encourages feeding raw information into the AI that it can analyze and construct its own implicit knowledge to solve a problem. Non-symbolic AI is generally inductive logic and includes machine learning and deep learning. Symbolic AI mimics human processes, ultimately automated, to sense, understand, decide and act. While it is typically okay for AI to sense without human interaction, it is a question of morality, ethics, authority, accountability and responsibility both legal and administrative to allow AI to automate across multiple applications (e.g., a computational synchronization, orchestration, and integration that applies understanding, decision, and action feedback guidance to IT, OT, or IoT). In some implementations, security process 10 may provide a unique complementary and supplementary capability to the standard DEVOPS's HITL or HOTL Agile Management approach. This may allow not only to solve AI software development problems but also for AI to understand, decide and act with attribution. The AI Agile portion (e.g., which may be included with security process 10) may provide human-on-the-loop (HOTL) AI capability. The HITL capability supplies attributable continuous management over continued human intervention for SUDA. The HOTL capability supplies attributable continuous management over discontinued human intervention but with human authority to automate AI understanding, decision, and action, that synchronizes, orchestrates, and integrates multiple applications. Security process 10 may allow for full attribution and auditability that aligns with user authority, responsibility, and accountability. The lineage of DEVOPS developed and AI Agile authorized if-and-then computational algorithms may mimic human experts and may be permanently logged in time and algorithm detail by security process 10 in relation to user operational authority, responsibility, and accountability.

As discussed throughout and referring also at least to the example implementations of FIGS. 3-13, security process 10 may utilize 700 a first plurality of APIs operating on a first module, wherein the first module may be transportable during operation. Security process 10 may utilize 702 a second plurality of APIs operating on a second module, wherein the second module may be transportable during operation, wherein the second module may include kernel level binary validation and restoration software, and wherein at least one of the first module and the second module may be interconnected to a mesh topology that maintains asymmetric redundancy. Security process 10 may interface 704 an asset with the second module. Security process 10 may determine 706 whether the asset is end-to-end secure based upon, at least in part, the kernel level binary validation and restoration software. Security process 10 may establish 708 an interface between the asset and the first module based upon, at least in part, determining that the asset is secure.

Generally, in any expeditionary network, the expectation may be for all participants to connect to share information (e.g., supporting a changing tempo of operations). Generally, an expeditionary network may be broadly described as a network of information capability that may deploy with operational units, on short notice, to operate in austere, resource limited, or contested locations or on supporting operating platforms, and capable of supporting operations immediately upon arrival and transfer information capability to and from and within the expeditionary area under constrained logistic or wireless network conditions due to lower size, weight and power requirements. The challenge is that the expeditionary environment tends to add significant risk to this expectation. Today, this is typically achieved predominantly through a non-fixed infrastructure based with heavy footprint and large threat surface communications (WIN-T) or a fixed infrastructure hub and spoke communication model. The flaws of WIN-T are apparent, for example, the system has little protection against electronic countermeasures, and it may be bulky and take days to set up, requiring large command tents bristling with servers and antennae. Understandably, defense officials may fear those command posts will act as a beacon, attracting attacks from sophisticated enemies. Both typically apply symmetrical voice and data communication redundancy with significant SWaP and logistic footprint. Symmetrical redundancy in current expeditionary communications applies consistent network modalities. For example, current symmetric topology typically interface with a second similar topology in weight, size, power requirement, and capability, distributing key network components evenly around a central transmission, server, switch, or data component and attempting to distribute data evenly in time. This symmetry meets functional and redundancy conditions or priorities regardless of operational conditions or priorities. Information is typically load balanced continuously with consistent throughput rates of data. Symmetrical topology generally applies omnidirectional tactical communications within the radio frequency spectrum or high-power outer space-based communications, emanating transmission with geographic signature. This symmetry presents single points of failure and presents simple and greater threat surfaces for competing systems to degrade. For instance, these symmetric topology conditions, as opposed to asymmetry topology, improve the chances for competing systems to understand, locate, interrupt, invade, contest, congest, and degrade the symmetric topology. Symmetry is easier to understand and therefore easier to find and predict, so in the context of operations, competing systems may expect, locate, see, interdict, and predict symmetrical topology in time and space and apply contestable conditions, information, or limiting factors/energy degrading the performance of symmetrical topology and its supporting logistics, thereby reducing the operational performance of users. Furthermore, functional topology consistency may demand consistent operational choices to attain optimal data transmission-based transport mobility. This may allow further predictability to competing systems. This includes environmental and cyber threats to the plethora of expeditionary deployed IT, OT, and IoT assets, further complicated by a plethora of non-integrated security or partial security at a minimum or limited scope of resilience, focused on just IT assets. Furthermore, competing systems may rapidly concentrate/mass physical and cyber degradation against numerous single points of network failure that are already dealing with data throughput congestion. Countering cyber threats may require split second SUDA automation, such as those provided by security process 10, that spans both defensive and offensive capability.

Therefore, as discussed throughout, security process 10 may be executed on an asymmetric redundancy that may complement a more agile tactical data communication solution that may both share and apply broadband (e.g., IT, OT, IoT) cybersecurity and relatively much larger big data sets with AI attribution and auditability. Security process 10 may complement by, e.g., providing a better data and cyber delivery then supplied by current data communication capability. Generally, the implementation of security process 10 may reduce SWaP and threat surface, and may present greater ubiquity and greater self-healing opportunity. Capability may be decentralized and distributed, and may be tactically amassable at relatively lower cost, supporting expendable and flexibly redundant hardware. Security process 10, by its nature, may make it easy for large, disparate units and their assets to communicate, collaborate, and securely share significant information and secure IT, OT, and IoT assets against cyber threats. In this ecosystem, that is hub and spoke network capable but not network dependent, all participants may also observe the entire state of the market at any time, as opposed to in a proprietary platform, where only the platform owner typically has the full overview. For example, the network capable but not network dependent open architecture may empower integration-based application and data deployment to evolving global edge-users and technically welcomes other software application integration. The disclosed architecture may allow, use, and support emerging and popular standards, ensuring older edge-users may continue to apply older applications while evolving edge-users and new edge-users may apply up-and-coming or rapidly prototype applications. As a standards-based architecture, security process 10 does not expose intellectual property (IP) or integration methods for service delivery, encouraging IP-secure microservice integration. Moreover, security process 10's continuous development services continuously remove proprietary integration points and services, furthering integration. Abstraction and service layers allow for purpose-built and standards-based integration. All participating applications may be loosely-coupled, reducing change and release management risk and complexity. This allows an easy way to evolve into a microservices ecosystem. Security process 10's API-led connectivity may enable rapid adoption. The approaches of security process 10 (e.g., which may be similar to the Corbomite DevOps, DevSecOps, and Agile AI approaches discussed throughout) may manage access and co-establish policies with customers, ensuring secure access to backend data and deploying AI supported configurable IT, OT and IoT security and privacy services. The microservices of security process 10 may be organized into functional categories, such as Integration Layer, Service Access Layer, Privacy and Security, Core Business Services, and Reporting, as well as operational categories, such as Command and Control, Intelligence, Fires, Maneuver, Logistics, and Weapon Systems. Categorization simplifies service development and maintenance while supporting reuse and independent scalability, ultimately lowering costs adding to the savings gained through the microservices. To automate Sense, Understand, Decide and Act, security process 10's Open Architecture may center a Symbolic AI (Expert System) capability at its very core that orchestrates, integrates and synchronizes various domains for AI applications. This configuration may enhance the power of scale ultimately expected from an Open Architecture. Any microservice or cluster of microservices may now develop playbooks and automate sensing through action with attribution per user authority, responsibility and accountability. In some implementations, this capability may support voice communications cybersecurity.

In some implementations, as discussed throughout, security process 10 may uniquely integrate at least two types of modules that then may uniquely create an asymmetric advantage beyond what traditional symmetrical networks provide, since, e.g., it may be the symmetry that may expose networks to competing system degradation. For example, in some implementations, security process 10 may utilize 700 a first plurality of APIs operating on a first module, wherein the first module may be transportable during operation. For instance, and referring at least to the example implementation of FIG. 8, an example environment 800 that may be used by security process 10 is shown. In the example, the first module (e.g., module 802) may, via security process 10, manage one or more APIs operating on it. In some implementations, different API's may be used for different functionalities, and there may be numerous APIs used. For example, these may include synchronize APIs to start, stop, lock, unlock, provision, and configure a node.

In some implementations, module 802 may be "ruggedized" and with scaling low SWaP, may be designed to go to and from the tactical environment. For example, module 802 may be drop, shock, moisture, and temperature range tested to meet or exceed both logistic transport conditions and to meet user condition specifications without requiring any additional hardware or special handling. The modules may be transportable to be put to use and during use. For example, module 802, while not in operation, may not require additional hardware and special handling during transport. Module 802 may retain full provisioned capability without requiring additional hardware or software support to be operated after transport. Module 802 may be employable while mobile at least because total capability less additional sustainable power is self-contained and does not require additional chassis or data inputs to operate. Its ruggedized capability may support mobile operation without special additional hardware configurations designed for varied mobile carriers.

The module(s) may deploy security process 10, including the AI expert system, may include content (e.g., data and applications), power, and wireless communications. Generally, without this integrated capability, an exponential increase in secure data per time of delivery cannot be achieved in the tactical environment, compared with current systems of dramatically increased SWaP.

In some implementations, security process 10 may utilize 702 a second plurality of APIs operating on a second module, wherein the second module may be transportable during operation, wherein the second module may include kernel level binary validation and restoration software, and wherein at least one of the first module and the second module may be interconnected to a mesh topology that maintains asymmetric redundancy. For example, the second module (e.g., module 804) may, via security process 10, manage one or more APIs operating on it (as noted above regarding module 802). As discussed throughout, the second type of module (e.g., module 804) may transport kernel level binary validation and restoration software to the tactical edge, applying very low SWaP to interface across any IT, OT or IoT asset. As a result, these assets rapidly may be deemed unsecure or secure to allow users to have the assets interface with one or more of first modules 802 securely. Generally, this may not be accomplished using current techniques without requiring significant SWaP capability, significant risk, or through the application of much greater time/resources.

In some implementations, module 802 and module 804 may be connected; however, it will be appreciated that module 802 may simply carry the software of module 804 and may not be connected. For example, module clustering capability of security process 10 may support user data and processing transport and operation agility and amassing. Users (e.g., via security process 10) may define how to apply each module's provisioned capability and determine how to deploy and interoperate module data storage, memory, microservice software applications to include the example and non-limiting CorbomiteWARE operating system, processing, and communication (e.g., WiFi, bluetooth, or cable interface) capability for initial deployment and what sort of mix of modules for potential clustering. Users (e.g., via security process 10) may also determine type module by SWaP, which may vary data storage, memory, processing, and communication (e.g., WiFi, bluetooth, or cable interface) capability. This initial deployment mix of modules may determine the potential combinations of clustered capability since the example disclosed modules may generally interface without a network or through a network. As well, the example disclosed modules may store data, memory, and processing capability in a clustered module(s) and may be disconnected from another cluster and set aside or transported and used at another location. This may support amassing similar capability with other users or to provide a means to continue operations with either stored data, memory, and/or processing capability at another location or in a different mobility mode. Some modules may be focused to provide processing power, others for data storage and transport, and others to supply both such as to supply AI driven cybersecurity or any other microservice that demands a mix of data, memory, and processing.

As discussed throughout, in some implementations, security process 10 may interface 704 an asset with the second module, and in some implementations, security process 10 may determine 706 whether the asset is end-to-end secure based upon, at least in part, the kernel level binary validation and restoration software.

In some implementations, the second module may be configured to interface 704 with the asset without network connectivity and/or without network connectivity. For example, each module may apply network protocols, non-network protocols, and APIs with wireless (e.g., WiFi, Bluetooth) or cable interface to connect, interface, orchestrate, integrate, or synchronize with a network, other module, or client. Network connectivity is not required to interface with any IT, OT or IoT asset as well as other modules; the latter is called clustering. Network protocols, non-network protocols and APIs may be provisioned and deployed by security process 10 as a software defined capability initially and re-provisioned in-stride by continuous security process 10 Development Operations (DEVOPS). Network protocols may be set by the user. A client may be any user supplied IT, OT, or IOT asset that may receive or provide a digital signal. A module or modules may connect in various combinations applying network protocols or APIs with wireless (e.g., WiFi, Bluetooth, etc.) or cable interface. These combinations may include module to network interface and connectivity that may or may not include clients, stand-alone module support with interface and connectivity with separate clients, or clustering interface and connectivity between modules and clients without network connectivity or clustering interface and connectivity between modules and clients that is network connected but not network dependent. When in non-network dependent mode, modules may interface in series or parallel dependent on each module's provisioned and deployed capability and the user-defined operational purpose the combination may provide.

In some implementations, the asset may be an information technology asset. Generally, an information technology (IT) asset may include any asset that applies information processing, including software and hardware, to store, retrieve, transmit, manipulate and generate data for system use. Example assets may include computers, data storage equipment, printers, data center devices such as servers, network devices such as routers or modems, desktop devices such as a computer keyboard or mouse, and other computer peripherals, as well as any other devices disclosed throughout. The example modules associated with security process 10 may apply APIs and protocols to interface with IT devices and ensure IT assets are secure and stay secure with software that observes, operates, and occupies interface between the asset and any user, all with or without a network. IT assets are also generally secured through cable interface with our binary validation and restoration software supplied by a dongle hardware device, which may not require any network capability.

In some implementations, the asset may be an internet of things asset. Generally, internet of things (IoT) assets may include a system of interrelated computing devices, mechanical and digital machines, sensors, actuators, and control systems that are provided with unique identifiers (UIDs) and the ability to receive or transfer data over a network using a network protocol without requiring human-to-human or human-to-computer interaction. The disclosed example modules may apply APIs and protocols to interface with IoT devices and ensure the IoT asset is secure and stays secure with software that observes, operates, and occupies interface between the asset and any user, all with or without a network. Contemporary national security operations are becoming increasingly complex, multifaceted, and unpredictable. The IoT is a potential solution to this problem. As the high-tech asset capabilities of friend and foe advance, military commanders must anticipate, assess, and act in limited timeframes, even if network capability is congested, constrained, limited or off. By integrating national security assets (or other types of assets) as IoT assets into existing defense infrastructures, national security sensing, understanding, decision, and action can become more efficient and effective. Security process 10 may thus have the capability to secure, interface, receive, store, and transmit IoT data without the connectivity of a network. IOT assets may also be secured through cable interface with the example disclosed binary validation and restoration software supplied by a dongle hardware device, which does not require any network capability.

In some implementations, the asset may be an operational technology asset. For example, an operational technology (OT) asset may generally include any hardware and software that detects or causes a change through the direct monitoring and/or control of physical devices, processes and events in the enterprise. The example disclosed modules of security process 10 may apply APIs and protocols to interface with OT devices and ensures OT assets are secure and stay secure with software that observes, operates, and occupies interface between the asset and any user, all with or without a network. OT assets are generally secured through cable interface with the disclosed binary validation and restoration software supplied by a dongle hardware device (or other similar device), which does not require any network capability. OT assets may generally include control, weapon, power, utility, propulsion, maintenance, switch, and sensor devices and systems, each of which may interface with security process 10.

As discussed throughout, in some implementations, security process 10 may establish 708 an interface between the asset and the first module based upon, at least in part, determining that the asset is secure.

In some implementations, security process 10 may initiate 710 at least one of updates, orchestration, integration, and synchronization of the asset based upon, at least in part, connecting at least one of the first module and the second module to the mesh topology. Generally, updating may include refreshing operational configuration from centralized trusted source upon network connection. Synchronization may generally include exchanging bi-directional data to ensure that the node and the cloud have the latest data-sets. Orchestration and integration may generally include deploying appropriate computational resources to facilitate analysis, processing, and data mining of collected data. In some implementations, assets of security process 10 may facilitate the automatic synchronization of nodes once network connected. Security process 10 may rely on mesh topology to ensure multi-path and multi-master synchronization. This may be beneficial, as security process 10 may include the capability to dynamically locate a path to destination in a disjointed mesh topology.

In some implementations, security process 10 may use or be incorporated into the strength of the global military and/or commercial logistic and deployment systems from the industrialized rear area through field operating areas concurrently with global military or commercial telecommunications to all the services available by security process 10, which may be similar to the services described throughout provided by, e.g., Corbomite's CorbomiteWare™, AI Agile, Security, SUDA Agile, and Corbomite™ Deployer capability.

In some implementations, the size, weight, and power (SWaP) to bit-per-unit of time ratio, as well as cost-per-unit ratio for capabilities similar to security process 10 may provide an expeditionary communication industry-wide paradigm shift in capability and cost, where data delivery does not require satellite, telecommunication or electromagnetic radiation content but may still be capable of being integrated with such communication techniques to provide greater operational flexibility. The amount of information and applications provided per time of delivery may be an exponential gain for the expeditionary environment.

Figure 8:
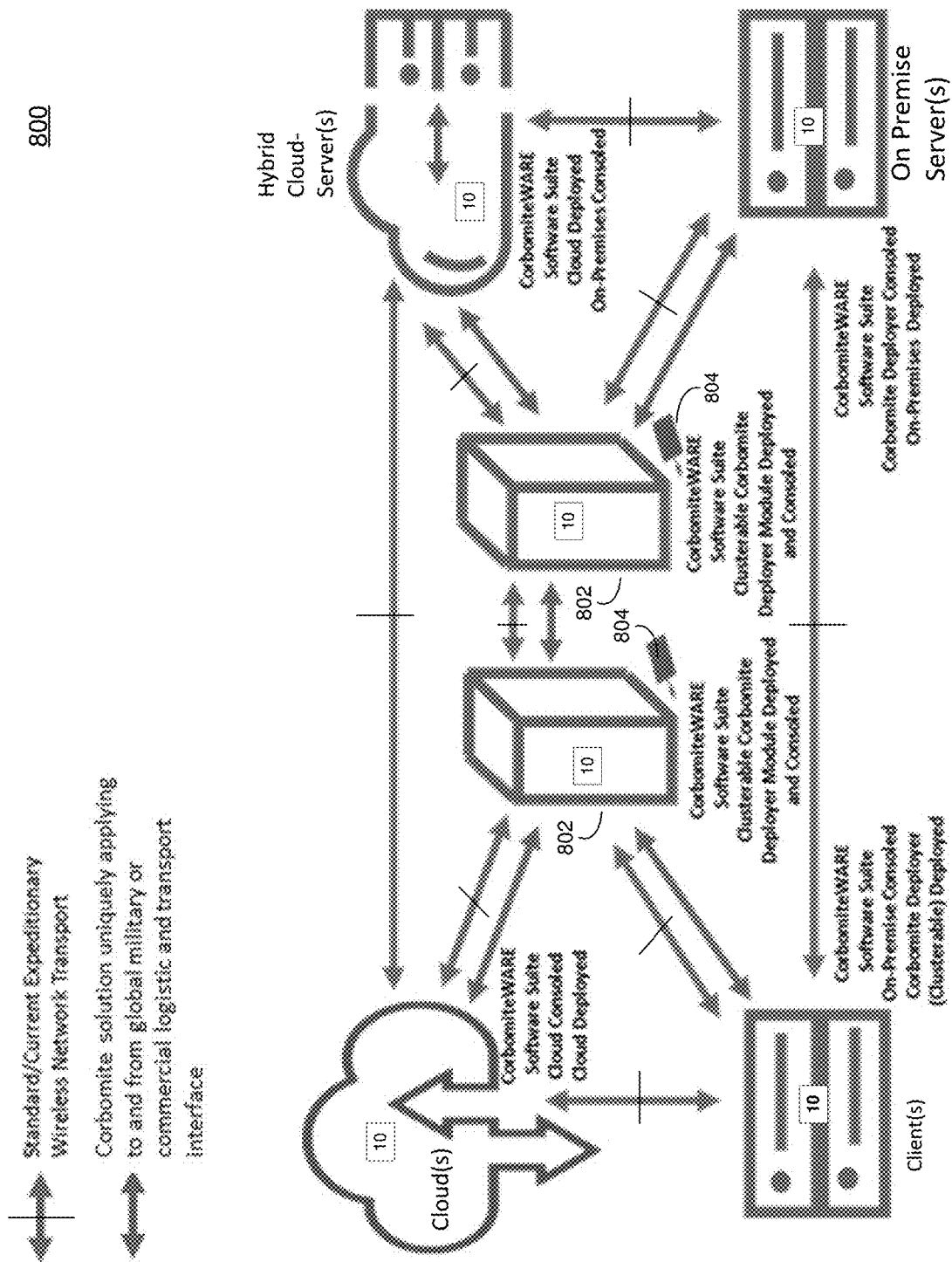
FIG. 8 is an example diagrammatic view of an environment that may be used by a security process according to one or more example implementations of the disclosure.

In some implementations, and referring still at least to FIG. 8, environment 800 may include a cloud console and cloud deployed base security process 10 software suite that may include functionality (discussed throughout the present disclosure) similar to that provided by, e.g., CorbomiteWare™, Corbomite™ Security Integrate Software Suite (CSISS) and aiSUDA software. This deployed suite of capability may, in some implementations, meet up to the standards of, e.g., Federal Information Security Management Act (FISMA) High, Federal Risk and Authorization Management Program (FedRAMP) International Traffic in Arms Regulations (ITAR); Criminal Justice Information Services (CJIS); and Provisional Authorization (PA) by the Defense Information Systems Agency (DISA) for Impact Level (IL) 6 workloads, as defined in the Department of Defense (DoD) Cloud Computing (CC) Security Requirements Guide (SRG), etc.

In some implementations, environment 800 may include an on-premises console and deployed or cloud console on-premises deployed base security process 10 suite that may include functionality (discussed throughout the present disclosure) similar to that provided by, e.g., CorbomiteWare™, Corbomite™ Security Integrate Software Suite (CSISS) and aiSUDA software. This deployment may be customer environment dependent, where security process 10 may apply DEVOPS with functionality (discussed throughout the present disclosure) similar to CorbomiteWare™, Corbomite™ AI Agile, and CorbomiteaiSUDA™ Agile. In some implementations, security process 10 may apply some or all of the above to support migration, provision, and deployment from planning through execution. Generally, user's "console" (e.g., via security process 10) may interface into software and hardware applying web-based, graphic user, or contextual interface protocols. User's console may (e.g., via security process 10) manage and apply software, hardware applications and services, including web applications, data analysis, virtual machines, datastore/databases, networking, and DEVOPS services. Users may apply security process 10 to console, helping them deploy, scale, run, and diagnose any security process 10 supplied capability, applying a simple graphic user interface. Users are on-premise consoled generally when they interface with an on-location server. Users are generally cloud consoled when they interface by a network with a cloud service. Users are generally on-premise consoled when they interface with a local on-premise server(s). Users are generally clusterable module(s) consoled when they interface by a network with on-site modules disclosed.

Software is generally "deployed" by cloud, on-premise servers, clients, or clusterable modules. Each type of deployment may be an arrangement and degree of networking, storage, servers, virtualization, operating systems, middleware, runtime, data and software applications that is provisioned for deployability and a user receives on demand from an on-site, local (on-premise LAN), or separated (cloud or on-premise WAN) location. Cloud-based software is generally hosted on another entity's server(s) off-site and accessed by a user through a browser and telecommunications network (standard network). On-premise deployed software is generally hosted locally, on an entity's own computers and servers and is user accessed by local area network (LAN) or wide area network (WAN) infrastructure. LANs and WANs are also standard networks. Cloud or on-premise infrastructure may require much more size, weight, and power distributed locally and regionally than required by security process 10 to deliver, e.g., mission-specific data, memory, processing, power, and wireless/cabled interface. This may also create more vulnerabilities for competing system exploitation, increasing the threat surface.

Clients are generally thick, thin, or zero types. Thick clients are generally full-featured computers that function whether they are remotely connected to a server environment, module, or not. A thin client is generally a lightweight computer with no hard drive that establishes a remote connection with a server-based computing environment or module connection. A zero client may generally require a remote connection and server-based computing environment or module connection to operate.

To remain console and deployment agile, security process 10 deployed software may be hosted on the cloud and within deployable modules and may be deployed from a module for on-premise hosting as well. The state of the industry applies combinations between cloud, on-premise and client consoling and deployment using standard networks regularly per standard methodologies, providing intentionally commercial and federal symmetry. By contrast, security process 10 may allow users to toggle between or in an integrative fashion between security process 10, cloud, or on-premise console/ deployment and apply hybrid console and deployment variations well beyond standard symmetry to support and warfight (or otherwise) in expeditionary contested, congested, and limiting environments. This variety in networking, storage, servers, virtualization, operating systems, middleware, runtime, data and software may, at least in part, create the disclosed asymmetric capability of security process 10. Known systems have to threaten in time and space an exponential increase in combinations and permutations with much lower threat surface.

In some implementations, environment 800 may include one or more Advanced Content Logistic Modules (ACLM) with the software suite and the security modules with ultra-low SWaP and threat surface providing kernel-level binary system integrity validation and restoration software capability discussed throughout. In some implementations, the ACLM does not include the dongle/module that applies binary validation and restoration. As noted above, these modules may be transported using the strength of the global military and/or commercial logistic and deployment systems from the industrialized rear area through field operating areas concurrently and/or in parallel with global military or commercial telecommunications. As noted throughout, these modules may be network capable but not necessarily network dependent, and may uniquely mass clusterable security process 10 capability along with any operational software-based capability.

In some implementations, the ACLM may include hardware modules that may scale in size and weight (e.g., 49 pounds to 4 pounds and continuously getting smaller in size and weight) that may be ruggedized to operate in field conditions that may include, e.g., up to 200G impact, airdrop-able delivery, and MIL-S-901D Grade B shock resistance with a 0 to 45 degrees celsius operating range. It will be appreciated that various other field conditions may be to the ACLM without departing from the scope of the present disclosure. The provisioned hardware and software suite of security process 10 may also meet up to the standards of, e.g., Federal Information Security Management Act (FISMA) High, Federal Risk and Authorization Management Program (FedRAMP) (International Traffic in Arms Regulations (ITAR); Criminal Justice Information Services (CJIS); and Provisional Authorization (PA) by the Defense Information Systems Agency (DISA) for Impact Level (IL) 6 workloads, as defined in the Department of Defense (DoD) Cloud Computing (CC) Security Requirements Guide (SRG), etc.

As discussed throughout, the security modules with ultra-low SWaP and threat surface may provide kernel-level binary system integrity validation and restoration software capability. They may, via security process 10, support tactical edge-user and rapid deployment non-network dependency and non-threat information dependency IT, OT, and IoT cybersecurity, which may, via security process 10, inform users through graphical interface protocols or simple red/green diode indicator light, and may automatically share sensor data back to the integrated security software suite upon an interface of security process 10. As discussed throughout, these modules may require only asset interface, as opposed to network connectivity, to provide a base layer of security that is green light/red light go/no go security criteria, which may be accomplished without requiring threat information updates. In some implementations, the modules may be network capable through the asset it interfaces with and may share information back to portions of security process 10 network connectivity via element 1 and/or element 2 (e.g., shown at least in FIG. 11) and/or the ACLM interface.

As shown in FIG. 8, it may be demonstrated the deployment and consoling as well as transport options for the software suite capability of security process 10 that may include big data delivery with processing power, power, wireless options (e.g., such as WiFi and Bluetooth) that may be network capable but not necessarily network dependent, and may share the security resilience and attributable and auditable AI expert system capability of security process 10 with any asset with which it interfaces. This unique, big-content rapid transport, ubiquity with low SWaP and threat surface, besides also end-to-end IT, OT, and IoT security resilience and AI expert system delivery, may be a means to also deliver any other operating systems or application tools with greater redundancy and asymmetric redundancy. If standard/current expeditionary wireless network transport is degraded, congested, or offline, security process 10 may be a means to ensure the full suite of security process 10 delivery, as well to delivery of any other expeditionary software defined capability. Standard/traditional networks may generally apply to telecommunications, local or wide area network infrastructure per commercial or federal standards in a combination that is templated and repeated consistently, developing a symmetry that is easily foreseen and tampered with by a competing system. Expeditionary conditions may generally require special standard network extensions often involving space-based or tactical telecommunications infrastructure. Space-based and tactical infrastructure due to limitations of physics and resources to support size, weight, and power (SWaP) of infrastructure restricts bandwidth, throughput, and connectivity, by comparison to other standard infrastructure, limiting the degree of consoled and deployed cloud and on-premise capability that may be delivered to every expeditionary edge-user. Warfighting and environmental conditions may further require additional networking infrastructure including redundancy, maneuverability, and agility. Warfighting can destroy or affect adversely the capability of infrastructure. The application of space-based and tactical telecommunications infrastructure over the years and the linear deployment and utilization of this infrastructure creates even further vulnerabilities besides limited capability. The application of this capability is relatively consistent and repeated to a degree that physical or cyber adverse effects are prevalent or expected to be prevalent. These insufficiencies and vulnerabilities due to the prevalent symmetry, both physical and in application, place US national security doctrine to attain and maintain relative information superiority to defeat or deter America's competing systems at a high risk. An example symmetrical network is shown in the above-noted FIG. 4B.

The incorporation of the disclosed modulated capability amassed and clustered to a degree that reduces strategic, operational, or tactical vulnerability and supplies strategic, operational and tactical strength allows military commanders and national security leaders to apply hybrid combinations of the disclosed security process 10 capability with or without standard network supplied capability. These combinations may provide and apply an asymmetric capability. When the standard network is insufficient, the user may (e.g., via security process 10) apply a degree of data, memory, processing power, software applications, and wireless/cabled interface by module or between modules to reduce the gap required by the user to achieve a combined standard network symmetry and the disclosed asymmetric or alone asymmetric effect. Security process 10's asymmetric effect may be furthered by the fact that users in various locations may vary the use of the security process 10 capability to overcome their local vulnerabilities and gain local strengths and modify the degree of threat surface as they require. An example of an asymmetric network is shown in the above-noted FIG. 8

Figure 9:
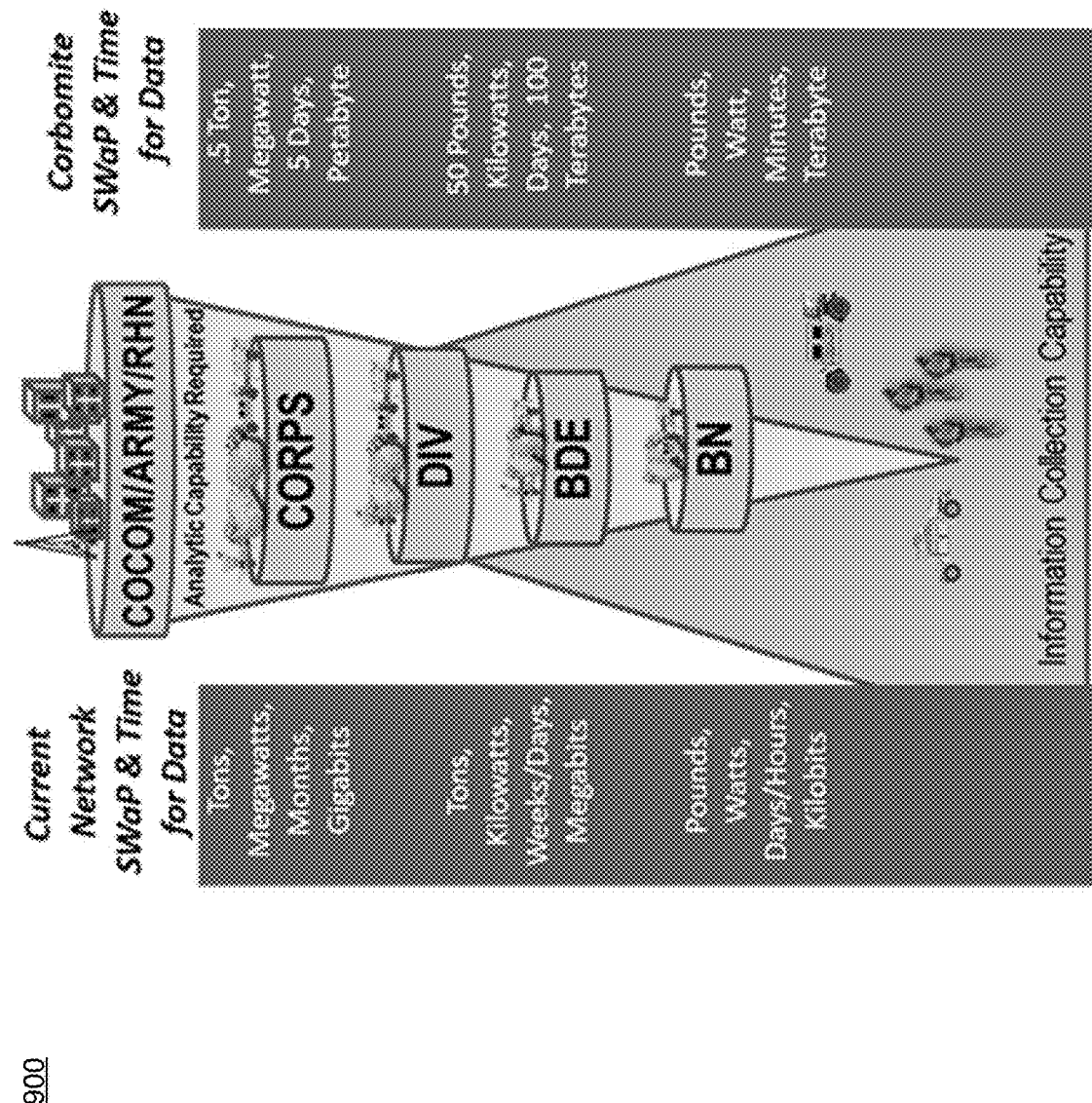
FIG. 9 is an example diagrammatic view of an environment that may be used by a security process according to one or more example implementations of the disclosure.
Figure 10:
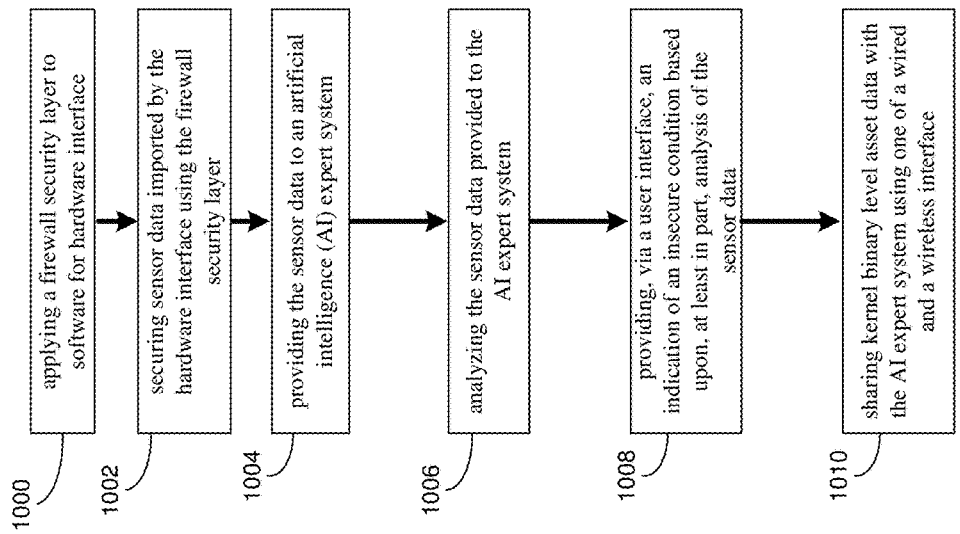
FIG. 10 is an example flowchart of a security process according to one or more example implementations of the disclosure.

In some implementations, and referring at least to the example implementation of FIG. 9, an example environment 900 that may be used with security process 10 is shown, discussed in more detail below. In some implementations, security process 10 may provide a cost effective "network complement or supplement," data, processing, memory and software application redundancy with end-to-end cybersecurity. For example, in some implementations, security process 10 may enable both defensive and offensive mission command support. Security process 10 may supply complementary or supplementary capability (e.g., data, processing, memory, software application, and cybersecurity) to any cloud, on premise server or client arrangement should its connecting traditional network or software/hardware infrastructure be degraded or off. By complementary, security process 10 may complete a capability that is degraded. By supplementary, security process 10 may provide additional capability such as a degree of data, processing, memory, software application, and cybersecurity redundancy. In harsh environments and warfare (for example), complementary and supplementary capability may reduce vulnerabilities that weaken capability.

Additionally, security process 10 may include an end-to-end cybersecurity that provide defensive or offensive sensing, understanding, decision, and action inputs and outputs for its infrastructure and for and IT, OT, and IoT assets with which it interfaces. By defensive, security process 10 may prevent a malicious action or effect that could reduce security process 10's or a friendly asset's strength with which it interfaces. This may be accomplished across one or more layers, e.g., geographic, physical, data link, network, transport, session, machine language, operating system (to include kernel level), software application, persona, organization, and government. Security process 10 may observe both user and asset activity within and between each layer as well as the steady state configurations, policy requirements, or conditions of each layer. Security process 10 may align related threat information into pattern analysis and recognition as these apply by layer. Security process 10 may take these inputs and directs outputs to defend itself or assets across each layer. This direction is generally automated, or user directed interface. Security process 10's automated defensive direction is per conditional coding and may be based on the user with system access per authority, responsibility and accountability.

By offensive, security process 10 may provide sensing, understanding, decision, or action output to take proactive or reactive adversarial action(s) that reduces the capability or strength of an unfriendly system. Security process 10's AI assisted cybersecurity software may process all inputs and outputs between user and asset, defending security process 10 and asset viability and suitability supporting user mission success. Malicious users, binary or code alterations, or malicious code may be recognized by security process 10, noted to authoritative users for defensive or offensive guidance/action, or automatically fended off or mitigated by pre-coded means and user proactive guidance. When a user wants to take offensive action, security process 10 may provide sensing, understanding, decision, and action inputs and outputs at all layers and between all layers to create offensive effects.

In some implementations, security process 10 may enable an exponential increase in big data volume, variety, and velocity. Currently, the US Army PEO C3T noted that the at the Highest level of tactical command, using traditional and tactical telecommunication networks, it takes tons of infrastructure, megawatts of power for transport, and months of time to receive hundreds of gigabits of information on a continuous basis. Security process 10's capability, using transport from either the US commercial and military logistic system or both (as an example), with hardware weighing 625 pounds, a megawatt of power for interface transfer, and a few days of transport may supply a petabyte of information. This increase in performance scales across lower tactical levels. The disclosed modules of security process 10 may carry tens to hundreds of terabits of information. The current throughput of the US commercial and military global logistic mobility assets may deliver the disclosed modules of security process 10 anywhere in the world much quicker and cost effectively than any telecommunications network. Security process 10 may also integrate with the traditional and telecommunications network to securely receive, store, and process information that is more time-sensitive. With security process 10, user decision makers may decide when and how they receive information based on various tradeoffs between data volume, variety, and velocity per resources required or desired.

In some implementations, security process 10 may enable use of AI and robotics fed by big data to lowest tactical level regardless of communication constraints and limitations. For instance, assume for example purposes only to expect the growing data requirement applied by expeditionary IT (AI and other applications), OT (robotics, sensors etc.), and IoT for continuously improving performance to have an exponential curve that exceeds the current and expected throughput of traditional and tactical networks to support expeditionary operations. At the lower expeditionary tactical levels, the throughput of tactical networks is even more constrained, more likely to be limited when contested, and subject to greater environmental constraints. Security process 10 may aim to support all tactical levels. AI and robotics demand a continuous input of massive data with processing power. These capabilities provide a continuous output of massive data that is mission critical to support maintaining or fielding follow-on AI or robotics capability. Both inputs and outputs may be required to be continuously and laterally shared to improve mission performance under contestable or limiting National Security conditions. As previously explained, the throughput of current network transport is generally insufficient. Applying security process 10's information transport and network capability but non-network dependency and security as a complement or supplement may improve the application of AI and robotic capability and sharing of information between these capabilities.

In some implementations, security process 10 may enable a lower threat surface, and may operate in EMCON and in some implementations, security process 10 may enable users (e.g., commanders) to plan and operate at various levels of emission control while still "networking" major data packets. Communication wireless emissions may provide electronic signatures that competing systems may observe, block, modify, interrogate, and locate. Communications infrastructure size, weight, and power usage may also create additional signatures. The degree of signatures may increase the threat surface, or the total opportunity a competing system has to adversely affect the emitting user. EMCON, meaning emission control, is generally the activity set by the user to reduce communication signatures emitted and physically displayed in order to reduce the effect by a competing system at observing, blocking, modifying, interrogating, or locating the emission. Security process 10's non-network dependence and low SWaP may allow mobile and agile operation with no or very little emissions and physical signature. Security process 10's ability to cable interface with another security process 10 module, a client, or an on-premise server as well as any IT, OT, or IoT asset may assure limited if any communication electronic emissions. A user (e.g., via security process 10) may apply the disclosed capability of security process 10 to maintain and apply IT, OT, and IoT capability varying the degree of EMCON to include the strictest conditions of no emissions.

In some implementations, security process 10 may enable easy deployment from USTRANSCOM, to Army Logistics, and UAV-UAS Systems (e.g., consider "drone" LiFi integration to further lower threat surface with increased network speed). For example, the low SWaP and ruggedness of the disclosed hardware relative to current expeditionary telecommunications and IT infrastructure may allow it to be transported much more efficiently and effectively applying military logistic mobility assets. Unmanned systems may transport by air, land, and water security process 10 capability to and from the expeditionary environment as well as laterally within the expeditionary environment. The lower cost and more efficient replacement capability, compared to no symmetric network infrastructure, also may make the security process 10 capability more expendable and replaceable than the requisite infrastructure to accomplish the same capability throughput. Since capability is generally degraded in the expeditionary environment, especially in the contest with competing systems, the ability to efficiently and effectively replace capability is a force multiplier. Additionally, new sources of emissions may reduce the electronic and physical signatures yet provide significant throughput due to improved physics. One such emission is light fidelity or LiFi, which is 100 times faster than WiFi-wireless fidelity. It requires a simple cable and low SWaP hardware to perform. Security process 10's ability to microservice LiFi capability interfaced with a security process 10 module's low SWaP and still be efficiently transportable, such as with a UAV, is an example of the adaptability and agility that security process 10 uniquely provides. This UAV may hover under good atmospheric conditions and supply security process 10 capability to users for which its discrete LiFi emissions are aimed.

In some implementations, security process 10 may enable the support of stand-alone and rapid stationing, deployment, and execution of Continuity of Operation capability. For example, most expeditionary operations require a Continuity of Operations capability. This capability generally provides the ability to change locations where both planning and current operations are commanded and controlled so a competing system does not adversely affect operations and planning or less so then the current location. Most of the command and control equipment is becoming software defined in IT, OT and IoT assets. Security process 10 allows the microservicing of some or all software defined capability or secure interface with this capability in low SWaP modules that are clusterable with other modules to produce an exponent of command and control IT, OT, and IoT support that can serve a suitable, feasible, and agile Continuity of Operations capability. The modules may be segregated and desegregated flexibly and timely to support a fluid situation and compartmented or consolidated organization.

As discussed throughout and referring also at least to the example implementations of FIGS. 3-13, security process 10 may apply 1000 a firewall security layer to software for hardware interface. Security process 10 may secure 1002 sensor data imported by the hardware interface using the firewall security layer. Security process 10 may provide 1004 the sensor data to an artificial intelligence (AI) expert system. Security process 10 may analyze 1006 the sensor data provided to the AI expert system. Security process 10 may provide 1008, via a user interface, an indication of an insecure condition based upon, at least in part, analysis of the sensor data.

As discussed below and/or throughout, and referring at least to the example implementation of FIG. 11, an example schematic block diagram of an environment 1100 that may be used with security process 10 is shown. Security process 10 may integrate end-to-end security software across expeditionary customer IT, OT, and IoT systems by, e.g., software facilitation. For example, in some implementations, security process 10 may include a security network that may deploy cybersecurity software down to assets by, e.g., cloud or customer on-premise capability, as well as by low SWaP and threat surface capability to support non-network dependency security operations. As another example, in some implementations, security process 10 may deploy bottom-up cybersecurity using, e.g., an ultra-low SWaP hardware/software "dongle" that may provide tactical edge-users immediate red light (e.g., problem) or green light (e.g., no problem) indications. In some implementations, the dongle may be very light weight (e.g., less than 4 ounces), however, it will be appreciated that the dongle may be various other weights without departing from the scope of the disclosure. As will be discussed further below, security process 10 may facilitate continuous security software suite DEVOPS and management provisions and may deploy various cable/dongle interface requirements.

Figure 11:
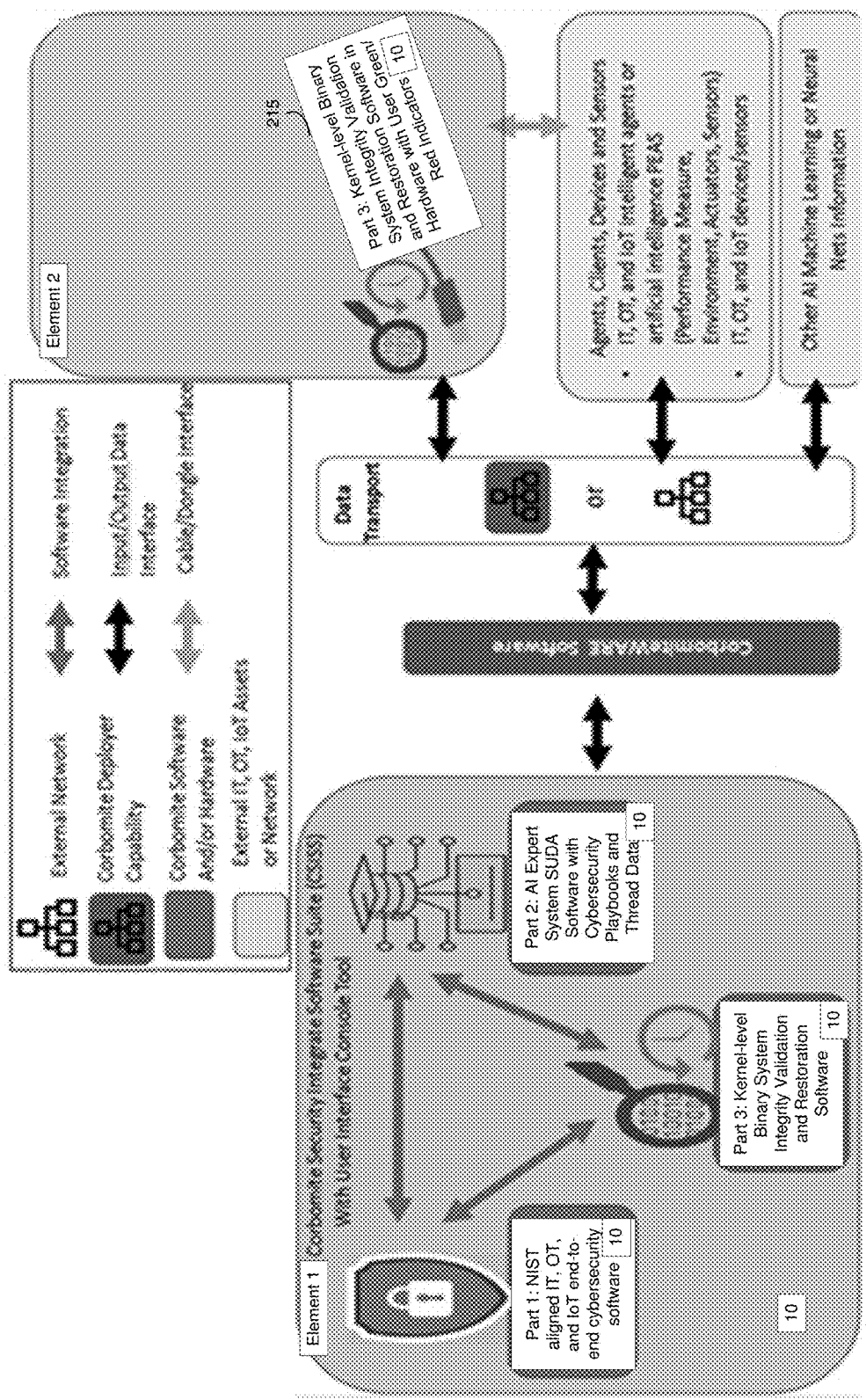
FIG. 11 is an example diagrammatic view of an environment that may be used by a security process according to one or more example implementations of the disclosure.
Figure 12:
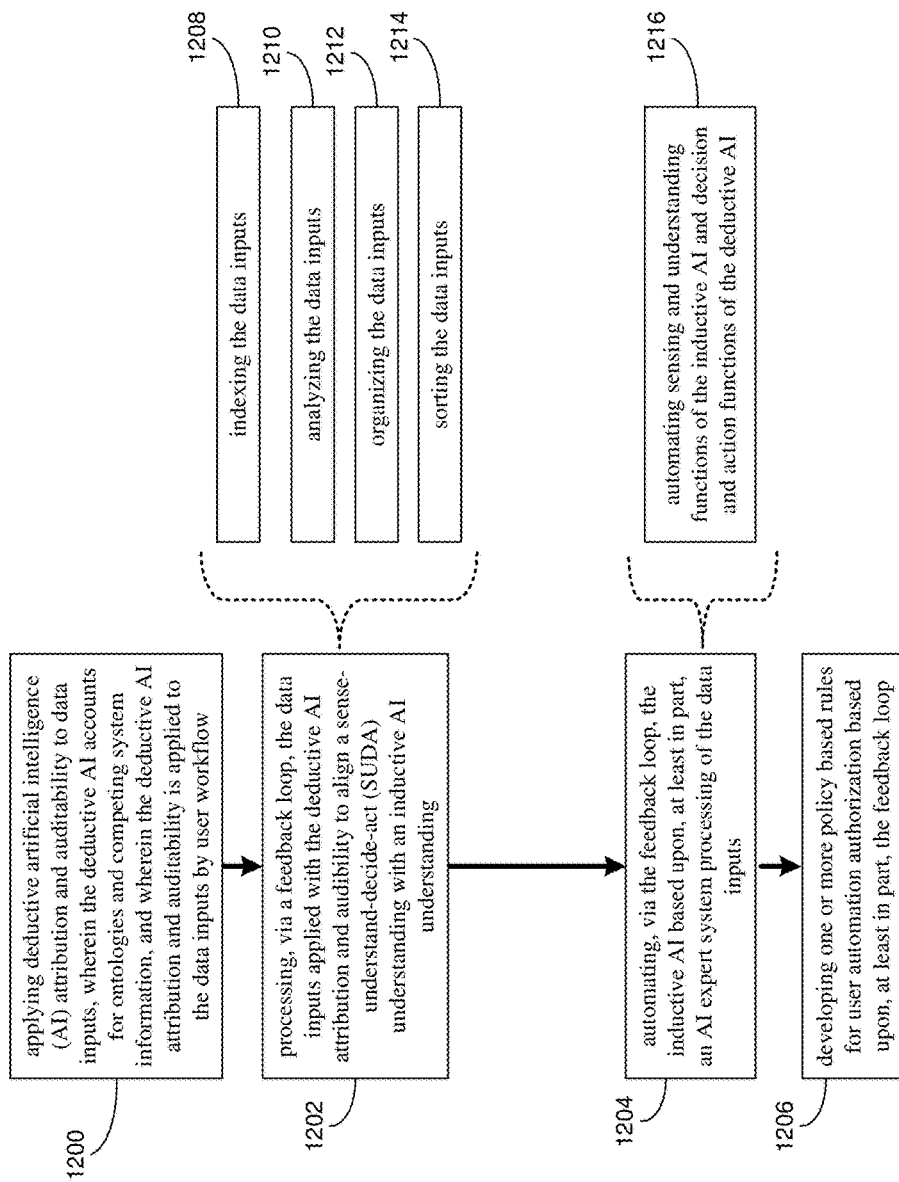
FIG. 12 is an example flowchart of a security process according to one or more example implementations of the disclosure.

As can be seen from FIG. 11, system 1100 may include, for example, at least two elements. Element 1 may include a security integrated software suite (SISS) of security process 10, and element 2 may include a kernel-level binary system integrity validation and restoration software of security process 10 that may be carried in small SWaP hardware (or other hardware) that may include Green/Red indicator diodes to establish go/no go for a user upon interfacing with any IT, OT, or IoT asset (discussed more further below).

In some implementations, security process 10 may apply 1000 a firewall security layer to software for hardware interface, and in some implementations, security process 10 may secure 1002 sensor data imported by the hardware interface using the firewall security layer. For example, in some implementations, element 1 may include, e.g., three integrated parts of security process 10. For example, part 1 may include (e.g., via security process 10), an agentless, NIST aligned, and end-to-end cybersecurity occupy, operate, and observe system for IT, OT, and IoT assets that may also provide a master security process 10 console for cybersecurity SUDA learning and control. Agentless may generally include security process 10's embedded cybersecurity software installed in the cloud or on a security process 10 module is not required to be separately installed on an IT, OT, or IoT client it interfaces with for security process 10 to secure that client. NIST aligned generally may include complying with National Institute of Standards and Technology (NIST) cybersecurity standards. End-to-end cybersecurity may generally include reaching and securing all IT, OT, and IoT assets interfaced with security process 10 across some or all of the following example layers: geographic, physical, data link, network, transport, session, machine language, operating system (to include kernel level), software application, persona, organization, and government. The master console (e.g., via security process 10) may provide through graphic user interface or contextual interface by the user, controls security process 10 operation across some or all microserviced applications. The hardware interface of security process 10 may be where the hardware platform receives an interface by cable or wireless technology to introduce data to and from the security process 10 module and/or another asset. The purpose may be to support the delivery of information between hardware assets and their internal system of data storage, memory, processing, power, and network capability. By using hardware-based dongle delivered cybersecurity software and/or security process 10's cybersecurity software suite within each module, both may also be cloud deployed.

In some implementations, the firewall security layer may enable the continuous import of the sensor data. Examples of sensor data by cybersecurity domain layer may include, e.g., Geographic—asset location or locational dependency; Physical—type of hardware or cable; Data link—type of network access and data format frames; Network—type of internet, packet data format, and protocol used: e.g., IP, ICMP, ARP, or RARP; Transport—transport or host to host interface, data format in segments or datagrams; Session—information that shows how and when opening, closing and managing a session between end-user applications; Machine language—binary coded structured data that provides tentative sense making hypothesis; Operating system (to include kernel level)—type of operating system (e.g., iOS, Windows, Linux etc.) across some or all abstraction layers especially the kernel's interface the lowest-level abstraction layer that is the operating systems core; Software application—type of browsers, software defined applications, type of service behind application such as SaaS or microserviced by container host; Persona—the user and user authentication, logged access and keystrokes, graphic interface logged entries, administrative authorities, responsibilities, and accountabilities; Organization—the asset or system organization's policy, procedures, and agreements by domain (e.g., security, etc.); Government—laws, regulations, policies, and frameworks by domain (security, etc.); Another domain may demand a different ontological layer reference and may be developed for each domain improving upon the same design baseline as the cyber domain.

In some implementations, security process 10 may provide 1004 the sensor data to an artificial intelligence (AI) expert system, and in some implementations, security process 10 may analyze 1006 the sensor data provided to the AI expert system. For example, part 2 may include (e.g., via security process 10), an AI expert system that may digest, store, and apply external data, ontologies, competing system/threat information, playbooks, AI attribution/audit information that may replicate and automate a cybersecurity expert. Security process may accomplish this, for example, by applying its knowledge base and inference engine. The expert system may ingest sensor data and apply an AI processing engine directed by playbooks that are continuously developed and improved in a sense, understand, decide, and act feedback loop of input and outputs. The playbook may be evolved from ontology development and emulation of a human expert all based on a domain. The playbooks purpose may be to emulate a human expert's ability through if-and-then coding and AI processes that a human expert agrees meets expert standards and are observable and understandable by a human expert. An ontology in computer operations is generally a formal representation of the knowledge by a set of concepts within a domain and the relationships between those concepts. It is typically used to reason about the properties of that domain and may be used to describe the domain. Security process 10's baseline domain that sets the foundational approach and organization for all other domain ontology and playbook development may include the cybersecurity domain. For cybersecurity, security process 10 may apply structured inputs from sensors, security analytics, competing system information, cybersecurity event information, or relative non-symbolic AI data to the AI expert system. The AI expert system of security process 10 may apply its playbooks with AI processing to reach conclusions. These conclusions may provide outputs of AI cybersecurity understanding, decision, and action to a user to apply or are automated by a user to accelerate input. Conclusions are typically organized by one or more of the cybersecurity layers, e.g., geographic, physical, logical (communication ports and protocols), machine language, operating system, software application, or persona layer. The first output across the layers may be knowledge representation and reasoning validation and hypothesis, an explanation of activity w/domain knowledge and human experience captured in cognitive playbooks. The next output may be knowledge representation and reasoning cognitive playbooks for decision-making based on sense-making results/explanation of activity and human domain expert. The final output may be security orchestrator with mechanistic response action per playbooks following command and control guidance and experience in the domain.

Part 3 may include (e.g., via security process 10), a kernel-level binary system integrity validation and restoration software that may occupy, operate, and observe the lowest level of binary logic between the tested software and the trusted software. Kernel-level binary system integrity validation and restoration software of security process 10 may apply an IT, OT, and IoT hardware-based cybersecurity approach. It may secure the hardware from any malicious software or coded signal by checking against stored bit-by-bit original baseline. It may operate in the binary space between software operating system and hardware at the lowest level of abstraction. It may check for a continuous steady state bit-by-bit. If a bit is "out of place" or "flipped" since its last check, this will be detected, reported, recorded, then executes response per policy, user guidance, or approved user automation. It may execute up to a full system restoration based applying a pre-stored baseline. Security process 10 may interface with, e.g., IT, OT, and IoT hardware via dongle module hardware direct connection, cellular, WiFi or disconnected Over-the-Air ("OTA") interface. All information may be shared automatically with security process 10's cybersecurity software. Since edge users often engage multiple IT, OT, and IoT devices interfacing randomly to support in an operational pattern that may subject them to malicious cyber intrusions, this capability may allow an immediate security check that does not require threat information or continuous network interface. For example, to check the hardware security of all security process 10 modules, these modules binary lowest level of abstraction baseline may be stored in all security process 10 Kernel-level binary system integrity validation and restoration modules. These Kernel-level binary system integrity validation and restoration modules may apply cybersecurity software when interfacing with all security process 10 deployer modules. If malicious activity is noted the user may see a red indicator; otherwise, the indicator may show green. It may do the same for some or all IT, OT, and IoT devices with which it is prepared to integrate.

In some implementations, element 2 may include, e.g., a security module, such as the above-noted dongle, which may include an ultra-low SWaP and threat surface. The security module, may allow physical interface to overcome EMCON that prevents wireless emissions or because the network availability does not allow cellular, WiFi or disconnected Over-the-Air ("OTA") interface. The degree of emitting or physical signatures may increase the threat surface, or the total opportunity a competing system has to adversely affect the emitting user. If emissions and physical signatures are low, then the threat surface is low. In some implementations, the firewall security layer may be a binary security criteria. For instance, the firewall security layer may include a kernel-level binary system integrity validation and restoration, and in some implementations, the kernel binary level asset data may include at least one of information technology, operational technology, and internet of things asset data. For example, the security module may include with kernel-level binary system integrity validation and restoration software (e.g., via security process 10) that may support tactical edge-user and rapid deployment non-network dependency and non-threat information dependency IT, OT, and IoT cybersecurity. A tactical edge-user may generally be a user that applies IT, OT, or IoT in the expeditionary space. The user may (e.g., via security process 10) deploy on short notice, to operate in austere, resource limited, or contested locations or on supporting operating platforms, and capable of supporting operations immediately upon arrival and transfer information capability to and from and within the expeditionary area under constrained logistic or wireless network conditions due to lower size, weight and power requirements. Rapid deployment non-network-dependency may generally include the ability to deploy on short notice, to operate in austere, resource limited, or contested locations or on supporting operating platforms, and capable of supporting operations immediately upon arrival and transfer information capability to and from and within the expeditionary area under constrained logistic and no wireless communications network availability conditions due to lower size, weight and power requirements. In some implementations, the security process 10 cybersecurity software suite may not require the continuous ingestion of cyber threat data to support IT, OT, and IoT cyber defense efforts. While it may apply such data if provided, it recognizes behavior or baseline anomalies as threats and applies cybersecurity SUDA per user requirements. An element that may be used as a data storage device only may not provide a firewall security layer. A element with processing power may provide a firewall security layer for itself or any interfacing asset to include an element.

In some implementations, security process 10 may share 1010 kernel binary level asset data with the AI expert system using one of a wired and a wireless interface. For example, security process 10 may (in some implementations), automatically share kernel binary level IT, OT, IoT asset data back to element 1 through a wireless and/or wired data interface. Security process 10 may share the data with other security process 10 cybersecurity software per the above-noted orchestration, integration and synchronization. This is just one of the possible ways at which security process 10 may recognize a secure/unsecure condition.

In some implementations, security process 10 may provide 1008, via a user interface, an indication of an insecure condition based upon, at least in part, analysis of the sensor data. For example, in some implementations, security process 10 may make use of a user interface to inform one or more users whether a threat exists. In some implementations, the user interface may include a graphical user interface, and in some implementations, the user interface may include one or more indicator diodes. For example, the interface may include, e.g., a graphical user interface displayed on one or more client electronic devices, or the module may include a binary indication, such as a red (not safe) or green (safe) diode indicator light. It will be appreciated that other techniques for providing indications of insecure/secure conditions may be used without departing from the scope of the disclosure. In some implementations, insecure condition examples may be organized by layer and may include, e.g., Geographic—asset location or locational dependency are noted as adversarial or potentially adversarial nodes; Physical—type of hardware or cable is noted as non-compliant with supply chain parameters or noted as posing a threat due to current activity or historical activity. Since this layer defines how long each bit lasts and how it is transmitted and received, malicious access is noted due to lack of authentication or authentication/access or activity showing that hardware or software packet sniffers may be monitoring network activity and enabling capture and decoding of data packets; Data link—type of link access protocol or link usage pattern or data format frames do not meet allowable conditions or suggest suspicious activity such as within the Address Resolution Protocol (ARP) process. The Data Link layer may be made up of two sub layers, including the logical link control layer (LLC) and the media access control layer (MAC). ARP may be used to resolve known Network layer addresses to unknown MAC addresses. ARP is a trusting protocol and, as such, may be used by hackers for ARPpoisoning, which may allow them access to traffic on switches they should not have; Network—type of internet does not apply security protocols or parameters, packet data format demonstrates anomalies inconsistent with safe formatting, and network protocol addresses are noted as previously adversarial or demonstrate a questionable pattern of activity such as route poisoning, denial of service activity, and spoofing; Transport—transport timing is compromised or has been compromised showing possible interrogation of passing data, host to host interface demonstrates kernel level bit anomaly, data format segments are flagged for being non-standard or datagrams are flagged as adversarial either showing signs of fragmentation or synchronize (SYN) attacks, Denial of Service (DoS), and buffer overflows. Fragmentation attacks occur when hackers manipulate datagram fragments to overlap in such a way to crash the victim's computer; Session—session or session management shows signs of hacker hijacking; Machine language (code)—binary coded structured data is the best code level to conceal a cyber threat virus. Machine language manipulation from a hex editor is noted due to baseline processing speed changes (e.g., millions time faster) or operating system is skipped with all activity being CPU-based. Xeno-morphological subroutines patterns are picked up by AI expert system as it carries multiple payloads across CPUs and adapts to each asset host with incubation periods; Operating system (to include kernel level)—outside code noted due to attempts to access the operating system across abstraction; Software application—software noted as containing MALWARE; Persona—the user repeated attempts to meet user authentication, logged access and keystrokes do not meet historical pattern of user, graphic interface logged entries show activity not pursuant with administrative authorities, responsibilities, and accountabilities; Organization—the asset or system organization's policy, procedures, and agreements by domain are not aligned with activity; Government—laws, regulations, policies, and frameworks by domain (e.g., security, etc.) are not aligned with activity; government supplied threat intelligence ingested and supporting Playbook in AI engine warns that a malicious pattern of activity is sensed tripping analysis and decision on action.

Thus, in some implementations, security process 10 may include an integrated single end-to-end cybersecurity management software solution by, e.g., applying an AI expert system (e.g., an AI cybersecurity expert system) that may be configured to integrate with and share this security capability across all expeditionary IT, OT, and IoT assets with which it may interface and may provide defensive and offensive SUDA capability. Moreover, security process 10 may include a software and a lower SWaP hardware solution that may also secure IT, OT, and IoT hardware assets upon interface by concurrently and/or separately deploying kernel-level binary system integrity validation and restoration, thereby providing rapid defensive and offensive SUDA capability that shares binary-level sensor information with an AI expert system and may be able to inform asset managers of insecure conditions though not requiring continuous cyber threat information for comparison. Furthermore, security process 10 may provide continuous graphical interface development and common operating picture delivery for decision of automated and AI expert system assisted defensive and offensive cybersecurity SUDA capability.

In some implementations, security process 10 may facilitate continuous software suite DEVOPS and management provisions and may deploy various cable/dongle interface requirements.

It will be appreciated that while a specific schematic block diagram of one or more components of security process 10 is shown in FIG. 11, more or less components may be used without departing from the scope of the present disclosure. As such, the specific components of security process 10 shown, as well as the specific layout of these components, should be taken as example only and not to otherwise limit the scope of the present disclosure.

In some implementations, security process 10 may be used commercially or in other sectors of government where, e.g., expeditionary circumstances demand similar capability and cyber resilience for IT, OT, or IoT assets. As such, any particular use described should be taken as example only and not to otherwise limit the scope of the disclosure.

As discussed throughout and referring also at least to the example implementations of FIGS. 3-13, security process 10 may apply 1200 deductive artificial intelligence (AI) attribution and auditability to data inputs, wherein the deductive AI may account for ontologies and competing system information, and wherein the deductive AI attribution and auditability may be applied to the data inputs by user workflow. Security process 10 may process 1202, via a feedback loop, the data inputs applied with the deductive AI attribution and auditability to align a sense-understand-decide-act (SUDA) understanding with an inductive AI understanding. Security process 10 may automate 1204, via the feedback loop, the inductive AI based upon, at least in part, an AI expert system processing of the data inputs. Security process 10 may develop 1206 one or more policy based rules for user automation authorization based upon, at least in part, the feedback loop.

In some implementations, security process 10 may apply 1200 deductive artificial intelligence (AI) attribution and auditability to data inputs. For example, security process 10 may continuously develop and execute one or more AI applications, such as the Corbomite™ AI application, with attribution and auditability. By "deductive AI" it may include Symbolic AI. Symbolic AI may deduce new facts from old facts, applying artificial intelligent means. This may rely on ontologies and rules/productions set up by humans emulating humans to process information. Symbolic AI (e.g., via security process 10) may create ontologies and rule based playbooks emulating a human expertise or other cognitive expertise per each problem domain. Security process 10 may deduce new facts from the old facts supplied from a human expert—an expert system. It may do this for each problem domain such as cybersecurity, fishing, or logistics etc. This effort may require security process 10 to continuously acquire considerable knowledge to understand each problem domain. However, it can yield results that are readily explainable to humans because they are derived from human knowledge models and encoded using symbols that humans understand. This understandability allows for attribution and auditability by humans. Hence, security process 10's deductive AI is termed an auditable attributable expert AI system. The AI applications may be symbolic (e.g., expert or deductive systems) or non-symbolic AI (e.g., machine or deep learning systems). Symbolic AI systems may require considerable knowledge acquisition, whereas, non-symbolic AI systems generally require significant data acquisition and data curating for the system to make accurate classifications. These two AIs may be integrated to input from and output to each other to overcome each type's weaknesses. When symbolic and non-symbolic AI work together this is termed co-symbolic. Security process 10 orchestrates, integrates, and synchronizes this sharing of data between AIs to support co-symbolic application. Attribution may be generally described as, e.g., data or other informational input (e.g., cyber threat data) and playbook logic that may be applied, at least in part, to a deductive AI portion of security process 10 to produce a sense-understand-decide-act (SUDA) output, described further below. In some implementations, security process 10 may ingest and develop data, information, and knowledge, organizing this for AI application by domains—such a cybersecurity, operations, intelligence, and logistics. Data may be unstructured facts and figures, relaying something specific and providing no further information regarding patterns, context, etc. Information may be data that is contextualized, categorized, calculated and condensed, providing relevance and purpose such as a trend or pattern. Information may answer the questions who, what, when where and how many. Knowledge may be information organized to do or imply know-how, experience, understanding, and insight. While cybersecurity data, information, and knowledge are baseline inputs to develop ontologies and playbooks for security process 10 cybersecurity application. There are many other domains. The intelligence domain has different types of data, information, and knowledge. This data may be a set of pixels in a picture that is informationally structured in Keyhole Markup Language in a Mercator projected pattern in order to imply that a tank is located in a specific location in time, threatening a defensive position. Security process 10's AI, may ingest this data, apply AI to align sense and understand knowledge to recognize this graphic pattern should be scrutinized and classified as an enemy tank, then per automated guidance of the user, security process 10 may be allowed to make the knowledge emulated playbook applied decision that the tank is a threat and sending an action code to a UAV system to apply its sensors to target the tank. Other examples may include a logistic system. Security process 10 may ingest and store logistics and sensor data with historical information about vehicle performance then applying AI playbooks microserviced capability developed from emulating expert logisticians, predict (sense and understands) a vehicle engine part is about to break, then automatically order (decides and acts) a new part from the logistic system to support predictive maintenance before the part breaks. The data, information, and knowledge may be retrieved from any storage device capable of interfacing with security process 10.

Generally, playbook logic may be a series of if-and-then coding emulating a human expert's process at classifying, diagnosing, monitoring, controlling, designing, scheduling, planning, or generating an option from data, information and knowledge. It does any of these, or a series of these, to sense, understand, decide and act applying an AI inference engine as allowed by the user.

Attribution may generally be described as, e.g., the interface to contextually and graphically show (e.g., via security process 10) efficiently and effectively all logic behind inputs per aiSUDA outputs. In some implementation, the interface of security process 10 may show at a minimum the contextual logs of every coded sequence behind security process 10's AI inference engine provided sensing, understanding, decision and action. Also, what data, information, and knowledge was applied to each sequence and what IT, OT, IoT asset or user provided this data, information or knowledge. It may show this in time across all asset interface or user access. Auditability may generally be described as the suitability and feasibility of an audit to achieve accurate and human understandable results from examining security process 10's AI processes. Thus, in some implementations, and as will be described below, security process 10 may include an AI expert system, which may apply 500 the AI expert system's (deductive AI) playbook attribution and auditability to ensure some or all development, particularly automated AI, remains customer accountable. For example, a user of security process 10 that is not the security process 10 vendor is the customer. Customer accountability may generally refer to the continuous legal, ethical and moral application of security process 10 AI per the customer's commensurate authority. Commensurate authority is that authority aligned with responsibility and accountability set by the user's higher authority policy. Customer accountability should be auditable on at least two levels. The first level is between the vendor and immediate user that sets the continuous conditions for daily security process 10 aiSUDA application. The second level is between the user and higher commensurate authority that sets the functional and operational policy for potential aiSUDA application.

In some implementations, the deductive AI attribution and auditability may be applied 1200 to the data inputs by user workflow. Vendor workflow may generally pertain to the sequence of security process 10 AI Agile processes through which a piece of work passes from one step to the next step (e.g., steps A through E in FIG. 6). This may be done to achieve user guidance and decision with attribution and auditability for all security process 10 aiSUDA application.

The example and non-limiting vendor workflow may generally be accomplished by vendor employees and users with commensurate authority continuously executing security process 10's AI agile per FIG. 6. They may be assisted by applications microserviced by security process 10 dependent on the maturity of the process. Step A. The vendor interprets evolving user functional requirements. Functional requirements are those contractually specified. Step B. These requirements are aligned with AI content requirements (e.g., data, information, knowledge, and complimenting applications such as machine learning or advanced analytics) and AI expert system application requirements. The alignment reconciles and cross-walks that all Step A. requirements will be accomplished by Step B. Step C. Is four-fold. Step C.1 identifies and creates the means to index, analyze, sort, collect, and store the data, information, and knowledge per AI functional requirements; Step C.2 creates the attribution model and auditable log mechanisms to expose all SUDA information with regard who, what, when, where, why per functional requirements; C.3 develops, integrates, or improves the expert system playbooks applying functional human expert emulation from stored or ongoing observation and when necessary improving functional ontology baseline to meet the functional requirements; C4. Develops user defined and authorized SUDA automation. Step D. Evaluate to align SUDA attribution with auditable vendor delivery demonstrating that the vendor applies appropriate authority, responsibility, and accountability. This is followed by the user (customer) authorizing Step D's resultant. Step E. The vendor provisions or improves and deploys or upgrades security process 10 AI capability. And, the new state is positioned in Step A for the new baseline of a continuous process.

Figure 13:
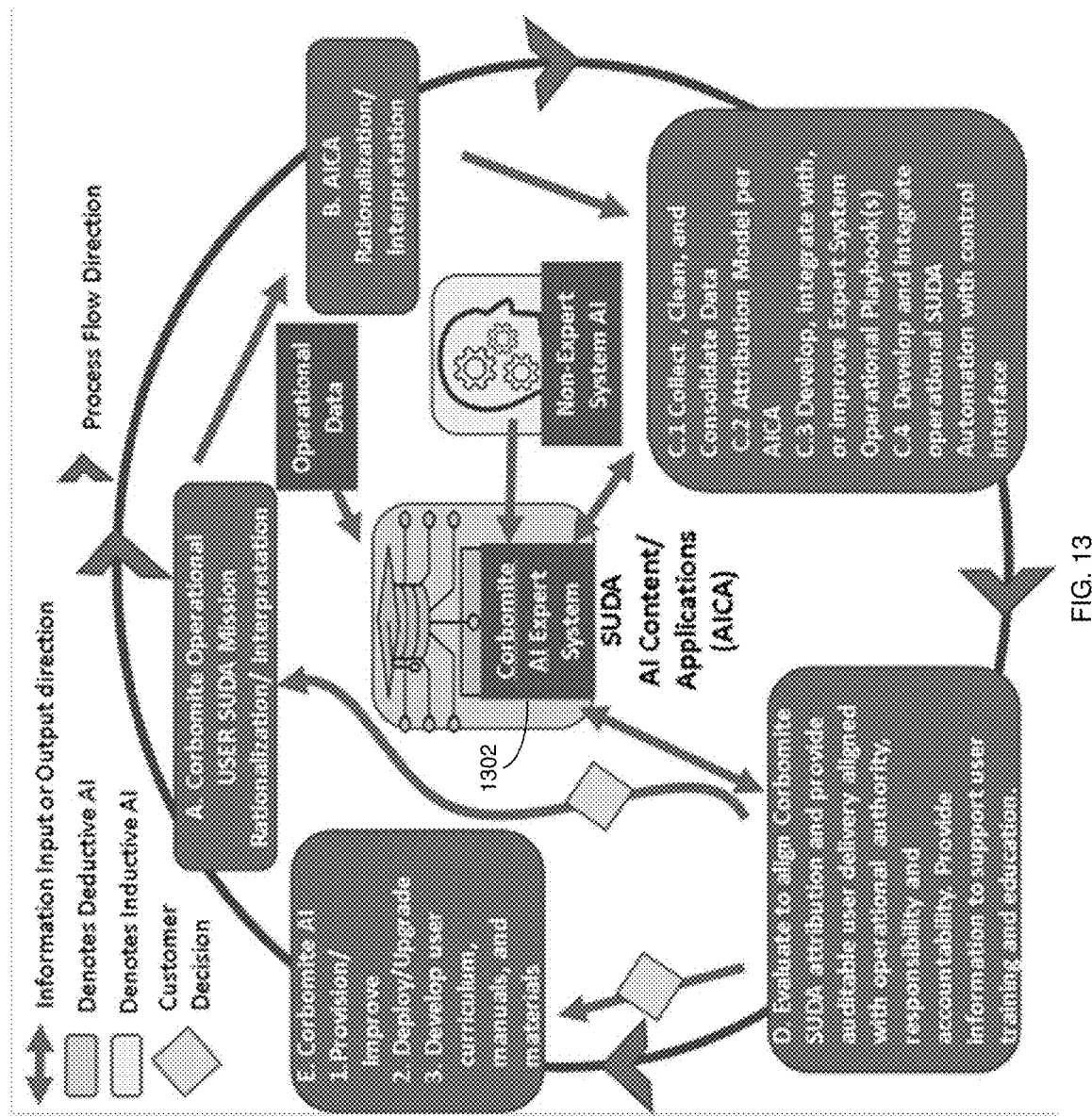
FIG. 13 is an example diagrammatic view/flowchart of a security process according to one or more example implementations of the disclosure.

User workflow may generally pertain to the sequence of security process 10 AI Agile processes through which a piece of work passes from one step to the next step (steps A through E in FIG. 13). This may be done to receive guidance and decision for the user from the user's higher commensurate authority over attribution and auditability for all security process 10 aiSUDA applications. The user workflow may generally be accomplished by vendor employees assisting users with commensurate authority continuously executing security process 10's AI agile per the example and non-limiting FIG. 13. Where the user workflow is contractually-based the vendor workflow is mission-based. By mission-based it may generally mean meeting the purpose, method and measurable end-state as well as any guidance provided by commensurate authority. They can be assisted by applications microserviced by security process 10 dependent on the maturity of the process. Step A. The user interprets evolving mission requirements. Step B. These mission requirements are aligned with AI functional requirements per FIG. 6. The alignment reconciles and cross-walks that all Step A. requirements will be accomplished by Step B. Step C. Is four-fold. Step C.1 identifies and creates the means to index, analyze, sort, collect, and store the data, information, and knowledge per user mission; Step C.2 creates the attribution model and auditable log mechanisms to expose all SUDA information with regard who, what, when, where, why per the higher authority mission decision requirements; C.3 develops, integrates, or improves the expert system operational playbooks applying operational expert emulation from stored or ongoing observation and when necessary improving operational ontology baseline; C4. Develops user defined and authorized SUDA automation per operational requirements. Step D. Evaluate to align SUDA attribution with auditable user delivery demonstrating that the user applies appropriate authority, responsibility, and accountability. This is followed by the user's higher authority authorizing Step D's resultant. Step E. The vendor provisions or improves and deploys or upgrades security process 10 operational AI capability. And, the new state is positioned in Step A for the new baseline of a continuous process.

In some implementations, the deductive AI portion of security process 10 may account for ontologies and competing system information, where the competing system information may include, e.g., one of cybersecurity threat information and the one or more policy based rules (e.g., playbooks) for user automation authorization. For example, security process 10 may apply an ontology baseline that is already configured for cybersecurity. This baseline is for showing cybersecurity data (e.g., events, incidents/cases, STIX, correlations, etc.) into the representation of entities (e.g., IP, user, removable device, etc.) and their relationships (e.g., event names, properties of event, internal relations, etc.). This baseline may be used for the future design and development of follow-on domain ontologies. Security process 110 may apply competing system information that is supplied by, e.g., the US government or any industry actor certified by the US government to produce and distribute competing system information (e.g., cybersecurity threat information).

In some implementations, security process 10 may process 1202, via a feedback loop, the data inputs applied with the deductive AI attribution and auditability to align a SUDA understanding with an inductive AI understanding. For example, in some implementations, processing 1202 the data inputs may include indexing 1208 the data inputs. Security process 10's open architecture and continuous DEVOPS and AI Agile (Step C in FIGS. 6 and 13) to support unique data indexing per microservices it provides. Security process 10 may apply these continuous services to gain the most efficient and effective index means for data to microservice relationships, such as AI microservices. Efficiency may be continuously sought to improve the speed of data retrieval operations to the cost of additional writes and storage space. Effectiveness may be continuously sought to improve data structure to speed a microserviced application operations. For example, DEVOPS services can support partial indices, where index entries are created only for those records that satisfy some conditional expression. security process 10 DEVOPS may include flexibility to permit indexing on user-defined functions and expressions formed from an creating user required built-in functions.

In some implementations, processing 1202 the data inputs may include analyzing 1210 the data inputs. Security process 10's open architecture and continuous DEVOPS and AI Agile (Step C in FIGS. 6 and 13) services support unique qualitative and quantitative data analysis per the microservices it provides. Security process 10 may apply continuous services to gain the most efficient and effective data analysis for any microservice it provides, such as AI microservices. This may include inspecting, cleansing, transforming, and modeling data to discover suitable information, inform conclusions, and support decision to support each microservice operation. Additional services support statistical and/or logical techniques to describe and illustrate, condense and recap, and evaluate data.

In some implementations, processing 1202 the data inputs may include organizing 1212 the data inputs. Security process 10's open architecture and continuous DEVOPS and AI Agile (Step C in FIGS. 6 and 13) services support unique data organizing for both physical and digital information per the microservices it provides. Security process 10 may apply these continuous services to gain the most efficient and effective index means for data to microservice relationships, such as AI microservices. This may include organizing structured and unstructured data.

In some implementations, processing 1202 the data inputs may include sorting 1214 the data inputs. Security process 10's open architecture and continuous DEVOPS and AI Agile (Step C in FIGS. 6 and 13) services support unique data sorting per the microservices it provides. Security process 10 may apply these continuous services to gain the most efficient and effective data sorting means for either raw or aggregated data per microservices, such as AI microservices.

In some implementations, an AI machine learning (inductive AI) portion of security process 10 may deliver algorithms, AI training information, and/or models combining both, and may then supply information as hypotheses. These outputs alone are generally insufficient for an AI unified view and measurable aiSUDA attribution and auditability to any user. Deductive or Symbolic AI may generally be described as human-readable representations of problems, logic and search. The most successful form of symbolic AI is expert systems. Inductive AI or Non-symbolic AI submits that human-based information formats are not always the best fit for AI, and encourages feeding raw information into the AI that it may analyze and construct its own implicit knowledge to solve a problem. Non-symbolic AI may generally be described as inductive logic and may include machine learning and deep learning. Security process 10 may orchestrate, integrate, and synchronize data and information inputs and outputs between systems and an AI expert system to accomplish sensing, understanding, decision, and action that is human attributable and human auditable. The expert system is human attributable at least because humans can observe and understand information logs that show all alignment between human process problem solving, logic and search with if-and-then algorithm representations. It aligns this with the humans' authorities, responsibilities, and accountabilities. All this may be auditable at least because security process 10 may ensure the logs can be made available to show the exact time or each attribution occurrence.

To gain SUDA that is attributable and auditable, security process 10 may apply its Agile AI continuous development methodology with its AI expert system that may encode, store, and organize knowledge/data inputs to align SUDA mission understanding with AI Content/Application understanding iteratively to provision/improve, deploy and/or upgrade the capability of security process 10. Put another way, by using a feedback loop to process 1202 the data inputs applied with the deductive AI attribution and auditability to align a SUDA understanding with an inductive AI understanding, as well as automating 1204, via the feedback loop, the inductive AI based upon, at least in part, an AI expert system processing of the data inputs, the resulting outputs would generally be sufficient for an AI unified view and measurable aiSUDA attribution and auditability, where security process 10 may then be able to develop 1206 one or more policy based rules for user automation authorization based upon, at least in part, the feedback loop. Security process 10's unique co-symbolic capability integrates the capabilities and benefits of both symbolic (deductive) AI and non-symbolic (inductive) AI with other security process 10 unique capability, especially the ability to provide expeditionary non-network big data delivery for AI processing. Both AIs may scale better SUDA delivery in direct proportion to the amount of data supplied. This may include combining data inputs and outputs both in a linear series or loop between symbolic and non-symbolic AI processes. The example purposes of this combination may be two-fold. First to ultimately gain attribution and auditability for across SUDA support, which non-symbolic cannot generally support. The second to employ the benefits of both AIs. Security process 10 microservices network capable or network dependent non-symbolic which is data-based and providing the ability to ingest and apply machine learning processes using unstructured data for input and delivering structured information and knowledge for output that satisfies the first level between sensing and understanding. This structured resultant output may support a tentative hypothesis that no human can attribute or audit. While human's can understand whether the conclusion or tentative hypothesis is suitable, no human can understand at any given time how the non-symbolic process arrived at this conclusion at least because the conclusion will vary by degree along an inconsistent algorithmic and training model logic varied by a machine constantly. Sufficient SUDA generally requires attribution and auditability. Supplying this structured data, information, and knowledge to the AI expert system then begins the process of aligning with ontological baseline and applying playbooks emulating human expertise and an inference engine. Security process 10's inference engine may apply logical rules to the knowledge base to deduce new information. It may apply forward or backward chaining. Forward chaining starts with the known facts and asserts new facts. Backward chaining starts with goals and works backward to determine what facts must be asserted so that the goals can be achieved. All can be reasonably understood by a human being. Security process 10's AI expert system may require structured data to provide attributable and auditable SUDA outputs, which is sufficient SUDA delivery. When confronted with unstructured data first that aligns to support either forward or backward chaining, security process 10 microservices the benefit of non-symbolic systems to supply structured data to feed an attributable and auditable AI expert system SUDA delivery.

Security process 10's AI Agile capability (FIGS. 6 and 13) may continuously support ontology and playbook development to support attributable and auditable AI expert system evolution. The continuous development may consider all expert system inputs and outputs as well as how and human expert evolves operational SUDA in relation to all. Ontologies and playbooks may evolve to improve SUDA delivery.

In some implementations, automating 1204 the inductive AI may include automating 1216 sensing and understanding functions of the inductive AI and decision and action functions of the deductive AI. Automated inductive AI may occur when security process 10 AI Agile applies user preferences to automate sensing to first level of understanding through coded permissions inputs to the non-symbolic (inductive) microserviced application. The same approach may allow for the automating of full understanding, decision and action to the symbolic (deductive) expert system.

SUDA examples may include, e.g., inputting unstructured video information into a non-symbolic security process 10 microserviced application, which may also input the video with aligning temporal and spatial information. The non-symbolic AI may output faces (e.g., sensing to first-level understanding) that may be recognized as potentially aligning with system users during a specific time and location, a set of tentative hypotheses. It may supply these alignments with statistical match probability and supply a tentative name to each face. These face names by time and space and statistical match (e.g., structured information) may then inputted into the security process 10 expert system. These expert system's playbooks executing per a cybersecurity domain then apply an inference engine with playbooks that associate IT, OT, and IoT persona behavior (e.g., knowledge—facts) with other cybersecurity layers of behavior in time and space. The playbooks may apply human expert emulation at recognizing malicious behavior (e.g., understanding) to supply further alignments of names, times, and places associated with these behaviors. This may be a validation of hypothesis with an explanation of activity.

Applying domain knowledge with human experience captured in cognitive playbooks. These alignments may be sent automatically by security process 10, due to user preference and AI Agile development, to a systems administrator who may provide this information (e.g., via security process 10) with attribution for authorities to decide to stop any user access whose names align with the names of questionable behavior. The user's authority may audit the full attribution and directs playbook development to automate tentative loss of access (e.g., action) for any user exhibiting the attributed behavior in the future.

Thus, in some implementations, and referring at least to the example implementation of FIG. 13, security process 10 may enable each step A-E of an example process to be continuously managed (e.g., quality assured, risk mitigated, etc.) per customer (e.g., vendor, user, etc.) requirements. Unlike a standard Agile DEVOPS mode that merely supports application development, security process 10 may be integrated into the standard Agile DEVOPS application (and/or may include its own similar standard Agile DEVOPS application) to conduct the development of any software, e.g., when there may be a requirement to ensure the development of SUDA attribution and auditability. The AI expert system portion of security process 10 (e.g., AI expert system 1302) may store, process, and graphically display past and present Agile information associated with security process 10.

Accordingly, in some implementations, security process 10 may use AI Agile management and learning methodologies that provide continuous AI deductive to inductive software application integration development with attribution and auditability. Users may be more efficient and effective at, held accountable for, given authority to, and delegate responsibilities for both aiSUDA products, decisions, and actions to include automating AI decisions and actions due, at least in part, to this process delivery. Generally, without automated decisions and actions of security process 10, AI cannot support the millisecond speed required to counter malicious cyber actions (e.g., cybersecurity). As noted above, security process 10 may process the relevant information, which may be stored and accessed in an AI expert system, and may provide the critical information and knowledge base to efficiently and effectively provide continuous education and training of AI knowledge to technical support staff, decision makers, their staffs, and subordinate users.

It will be appreciated that while a specific schematic block diagram and flowchart is shown in FIG. 13, more or less components and/or alternative steps and order of steps may be used without departing from the scope of the present disclosure. As such, the specifics shown in FIG. 13 should be taken as example only and not to otherwise limit the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
applying, by a computing device, a firewall security layer to software for hardware interface;
securing sensor data imported by the hardware interface using the firewall security layer;
providing the sensor data to an artificial intelligence (AI) expert system;
analyzing the sensor data provided to the AI expert system;
providing, via a user interface, an indication of an insecure condition based upon, at least in part, analysis of the sensor data; and
sharing kernel binary level asset data with the AI expert system using one of a wired and a wireless interface.

2. The computer-implemented method of claim 1 wherein the user interface includes a graphical user interface.

3. The computer-implemented method of claim 1 wherein the user interface includes one or more indicator diodes.

4. The computer-implemented method of claim 1 wherein the firewall security layer is a binary security criteria.

5. The computer-implemented method of claim 1 where the firewall security layer includes a kernel-level binary system integrity validation and restoration.

6. The computer-implemented method of claim 1 wherein the kernel binary level asset data includes at least one of information technology, operational technology, and internet of things asset data.

7. A non-transitory computer readable storage medium having a plurality of instructions stored thereon which, when executed across one or more processors, causes at least a portion of the one or more processors to perform operations comprising:
applying a firewall security layer to software for hardware interface;
securing sensor data imported by the hardware interface using the firewall security layer;
providing the sensor data to an artificial intelligence (AI) expert system;
analyzing the sensor data provided to the AI expert system;
providing, via a user interface, an indication of an insecure condition based upon, at least in part, analysis of the sensor data; and
sharing kernel binary level asset data with the AI expert system using one of a wired and a wireless interface.

8. The non-transitory computer readable storage medium of claim 7 wherein the user interface includes a graphical user interface.

9. The non-transitory computer readable storage medium of claim 7 wherein the user interface includes one or more indicator diodes.

10. The non-transitory computer readable storage medium of claim 7 wherein the firewall security layer is a binary security criteria.

11. The non-transitory computer readable storage medium of claim 7 where the firewall security layer includes a kernel-level binary system integrity validation and restoration.

12. The non-transitory computer readable storage medium of claim 7 wherein the kernel binary level asset data includes at least one of information technology, operational technology, and internet of things asset data.

13. A computing system including one or more processors and one or more memories configured to perform operations comprising:
applying a firewall security layer to software for hardware interface;
securing sensor data imported by the hardware interface using the firewall security layer;
providing the sensor data to an artificial intelligence (AI) expert system;
analyzing the sensor data provided to the AI expert system;
providing, via a user interface, an indication of an insecure condition based upon, at least in part, analysis of the sensor data; and
sharing kernel binary level asset data with the AI expert system using one of a wired and a wireless interface.

14. The computing system of claim 13 wherein the user interface includes a graphical user interface.

15. The computing system of claim 13 wherein the user interface includes one or more indicator diodes.

16. The computing system of claim 13 wherein the firewall security layer is a binary security criteria.

17. The computing system of claim 13 where the firewall security layer includes a kernel-level binary system integrity validation and restoration.

18. The computing system of claim 13 wherein the kernel binary level asset data includes at least one of information technology, operational technology, and internet of things asset data.

* * * * *